United States Patent
Preisler et al.

(10) Patent No.: US 6,649,002 B2
(45) Date of Patent: *Nov. 18, 2003

(54) METHOD OF MANUFACTURING ARTICLES UTILIZING A COMPOSITE MATERIAL HAVING A HIGH DENSITY OF SMALL PARTICLES IN A MATRIX MATERIAL

(75) Inventors: Darius J. Preisler, Macomb, MI (US); Lloyd R. Hilligoss, South Lyon, MI (US)

(73) Assignee: Patent Holding Company, Fraser, MI (US)

(*) Notice: Subject to any disclaimer, the term of this patent is extended or adjusted under 35 U.S.C. 154(b) by 50 days.

This patent is subject to a terminal disclaimer.

(21) Appl. No.: 10/000,292

(22) Filed: Nov. 2, 2001

(65) Prior Publication Data

US 2002/0055314 A1 May 9, 2002

Related U.S. Application Data

(63) Continuation of application No. 09/903,156, filed on Jul. 11, 2001, which is a continuation-in-part of application No. 09/797,472, filed on Mar. 1, 2001, now abandoned, which is a continuation-in-part of application No. 09/761,094, filed on Jan. 16, 2001, now abandoned, which is a continuation-in-part of application No. 09/709,877, filed on Nov. 9, 2000.

(51) Int. Cl.$^7$ .................. B32B 31/06; B32B 31/18; B32B 31/20; B32B 31/30

(52) U.S. Cl. ............. 156/221; 156/244.22; 156/244.24; 156/250; 156/252; 156/253; 156/269; 156/307.1; 156/307.7; 156/308.2; 156/309.9

(58) Field of Search ................ 264/109–128; 156/221, 244.22, 244.24, 250, 252, 253, 269, 307.1, 307.7, 308.2, 309.9

(56) References Cited

U.S. PATENT DOCUMENTS

| 4,025,686 A | 5/1977 | Zion |
| 4,086,115 A | 4/1978 | Sweet, Jr. et al. |
| 4,250,136 A | 2/1981 | Rex |

(List continued on next page.)

FOREIGN PATENT DOCUMENTS

| EP | 0 369 800 A2 | 11/1989 |
| EP | 0 370 148 B1 | 11/1998 |
| WO | WO 02/11965 | 2/2002 |

OTHER PUBLICATIONS

International Search Report for International Application No. PCT/US01/24305; Dated Nov. 16, 2001.
International Search Report for International Application No. PCT/US01/43694; Dated Feb. 24, 2003.

(List continued on next page.)

Primary Examiner—Stephen J. Lechert, Jr.
(74) Attorney, Agent, or Firm—Welsh & Katz, Ltd.

(57) ABSTRACT

A method of manufacturing articles utilizing a composite material having a high density of small particles such as microspheres in a matrix material is disclosed. In accordance with one aspect of the present invention, at least first and second layers of flanking material are disposed in a generally non-parallel relationship with respect to each other and then are pulled through a die. While the flanking material layers are being pulled through the die, a composite material is injected into a space defined between the at least first and second layers of flanking material. The composite material and the at least first and second layers of flanking material are heated as they pass through the die to cure the composite material and bond the at least two flanking material layers to the composite material, thereby forming a cured article.

12 Claims, 27 Drawing Sheets

U.S. PATENT DOCUMENTS

| | | | |
|---|---|---|---|
| 4,554,705 A | * 11/1985 | Murray | 16/110 |
| 4,610,923 A | 9/1986 | Schrock | |
| 4,729,807 A | 3/1988 | Hede et al. | |
| 5,049,342 A | 9/1991 | Scanlon et al. | |
| 5,122,318 A | 6/1992 | Bonet et al. | |
| 5,533,723 A | 7/1996 | Baum | |
| 5,769,046 A | 6/1998 | Ransone | |
| 5,846,357 A | 12/1998 | Meteer et al. | |
| 5,958,325 A | 9/1999 | Seemann, III et al. | |
| 6,062,569 A | 5/2000 | Strasser et al. | |

OTHER PUBLICATIONS

U.S. patent application Ser. No. 10/013,612, Preisler et al., filed Oct. 30, 2001.

U.S. patent application Ser. No. 09/999,034, Preisler et al., filed Nov. 1, 2001.

U.S. patent application Ser. No. 09/969,217, Winget et al., filed Oct. 2, 2001.

U.S. patent application Ser. No. 09/903,156, Winget et al., filed Jul. 11, 2001.

* cited by examiner

METHOD OF MANUFACTURING ARTICLES UTILIZING A COMPOSITE MATERIAL HAVING A HIGH DENSITY OF SMALL PARTICLES IN A MATRIX MATERIAL

CROSS-REFERENCE TO RELATED APPLICATIONS

This application is a continuation-in-part of U.S. application Ser. No. 09/797,472, filed Mar. 1, 2001 NOW ABN, which is a continuation-in-part of U.S. application Ser. No. 09/761,094, filed Jan. 16, 2001 NOW ABN, which is a continuation-in-part of U.S. application Ser. No. 09/709,877, filed Nov. 9, 2000, now currently pending.

FIELD OF THE INVENTION

The present invention generally relates to composite materials having a high density of small particles such as microspheres in a matrix material and, more particularly, to various methods of manufacturing shaped articles from this material.

BACKGROUND OF THE INVENTION

U.S. patent application Ser. No. 09/634,522, filed Aug. 8, 2000 (the "CM application") discloses certain new composite materials. Such materials include a matrix material that has a high density of small particles such as, for example, microspheres disposed therein. The CM application teaches that there are a large amount of the small particles relative to the amount of the matrix material such that there is a high-density packing of small particles into the matrix material. An aspect of the invention disclosed in the CM application is that the small particles are positioned very close together, and many of the small particles may even be in contact with adjacent small particles. The CM application states that the matrix material fills the interstitial space between the small particles, and that the composite material can include a greater amount of small particles than matrix material by volume, weight and ratios or percentages of weight and volume. The content of the CM application is incorporated by reference into this application as if fully set forth herein.

The CM application states that a mixing and molding process was used to make sample composite material plaques that have a flat, generally square or rectangular shape. The CM application also states that microspheres were mixed with automotive grade polyester, phenolic or vinyl ester resins to saturate the resin with microspheres to form a core of clay-like uncured composite material mixture.

The CM application states that the clay-like composite material mixture core was flattened in a sheet molding compound (SMC) hydraulic plaque press into a flat, plate-like plaque shape, and then the flattened core was removed from the press. The CM application states that dry cross-woven carbon fiber was applied to both side faces of the composite material core. The CM application states that, optionally, filter paper (coffee-type filter paper) was flanked on both sides of the fiber/core/fiber sandwich-type structure and sealed on all four edges to form a sealed filter bag encasing the fiber/core/fiber structure. The CM application states that the encased structure was inserted into the hydraulic press, the press was heated, and the plaque press compressed the encased structure for approximately 3 minutes.

The heat applied during compression cured the thermoset resin, as stated in the CM application. Upon opening the press, the sample composite plaque was observed to have fully wetted-out the flanking woven fiber, and evidence of the microspheres was clearly visible through the transparent filter paper, as stated in the CM application. The CM application states that sample composite material plaques were pressed and cured in about 2½ to 3 minutes, and that this is a remarkably fast manufacturing time as compared to slow curing resin molding which can require 8–24 hours to cure and an additional 2–6 hours to post-cure. The CM application also states that the ability to quickly manufacture products with the composite material disclosed therein provides significant advantages, such as high-speed manufacturing, continuous sheet production lines, and reduced manufacturing costs.

The CM application also teaches a sheeting process to make composite material boards. The CM application states that this process comprises a number of steps including, among others, the use of a pan, similar to a cooking sheet, for holding the components used to make the board, or other mold form having a desired shape. For example, the CM application states that woven fabric such as carbon fiber can be placed in the pan, a composite material can be placed on top of the carbon fiber, and that a second sheet of carbon fiber can be placed on top of the composite material.

The composite material disclosed in the CM application exhibits remarkable properties, and is suitable for use in a myriad of applications as discussed in the CM application. However, the manufacturing processes disclosed in the CM application are not operative to produce large numbers of articles in a continuous manufacturing process or producing molds for product development.

BRIEF SUMMARY OF THE INVENTION

It is desirable to provide a method of manufacturing shaped articles utilizing a composite material having a high density of small particles such as microspheres in a matrix material that is capable of commercial scale applications. In accordance with one aspect of the present invention, a modified form of the composite material can be made using B-staged thickener to make a composite material having a high density of small particles in a matrix material that is thick enough to be handled manually. B staging chemistry is used to pre-consolidate the reinforcing materials (such as woven fabrics) to the composite material along a sheet molding compound line. In one embodiment, the composite material is formed into a desired shape or product using a compression molding technique.

Providing such a method has a number of distinct advantages. First, the process disclosed herein is suitable for a myriad of commercial scale applications in which large numbers of composite material articles may be formed and manufactured. Second, the process disclosed herein significantly reduces the material and labor costs associated with producing shaped composite material having a high density of small particles in a matrix material and manufacturing shaped articles therefrom. Third, this process allows for a more efficient creation of durable, strong, lighter weight products that have various commercial uses. The composite material forms a lightweight product that is easy to manipulate and use that has the additional advantage of being strong. These products can be used as a substitute for various metals (such as steel), and provide the necessary strength without the additional weight.

Other features and advantages of the invention will become apparent from the description that follows.

BRIEF DESCRIPTION OF THE DRAWINGS

The objects and advantages of the present invention will become more readily apparent to those of ordinary skill in the relevant art after reviewing the following detailed description and accompanying drawings, wherein.

DETAILED DESCRIPTION OF THE INVENTION

Figure 1:
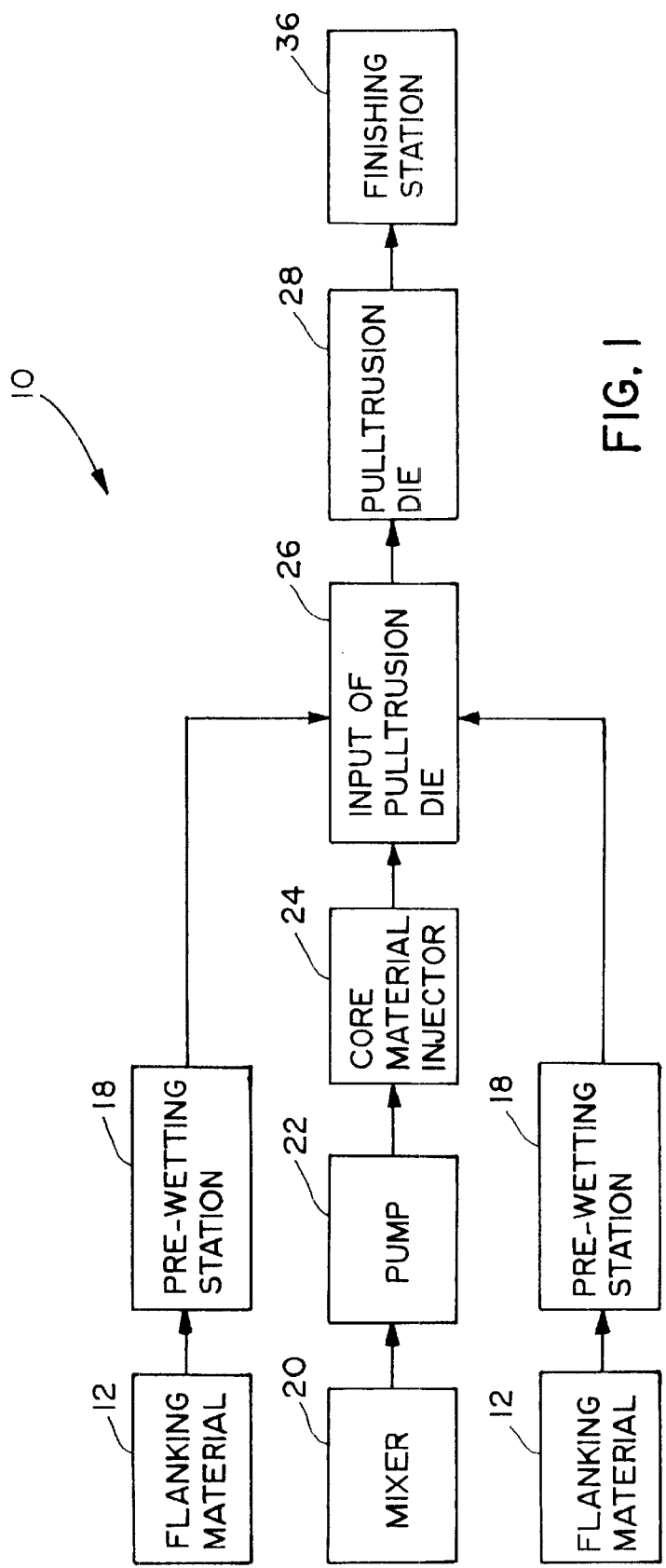
FIG. 1 is general, schematic diagram of a first embodiment of an apparatus for manufacturing articles utilizing a composite material having a high density of small particles, such as microspheres, in a matrix material.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description Of The Invention") relates to a requirement of the United States Patent Office, and should not be found to be limiting to the subject matter disclosed and claimed herein.

Figure 3:
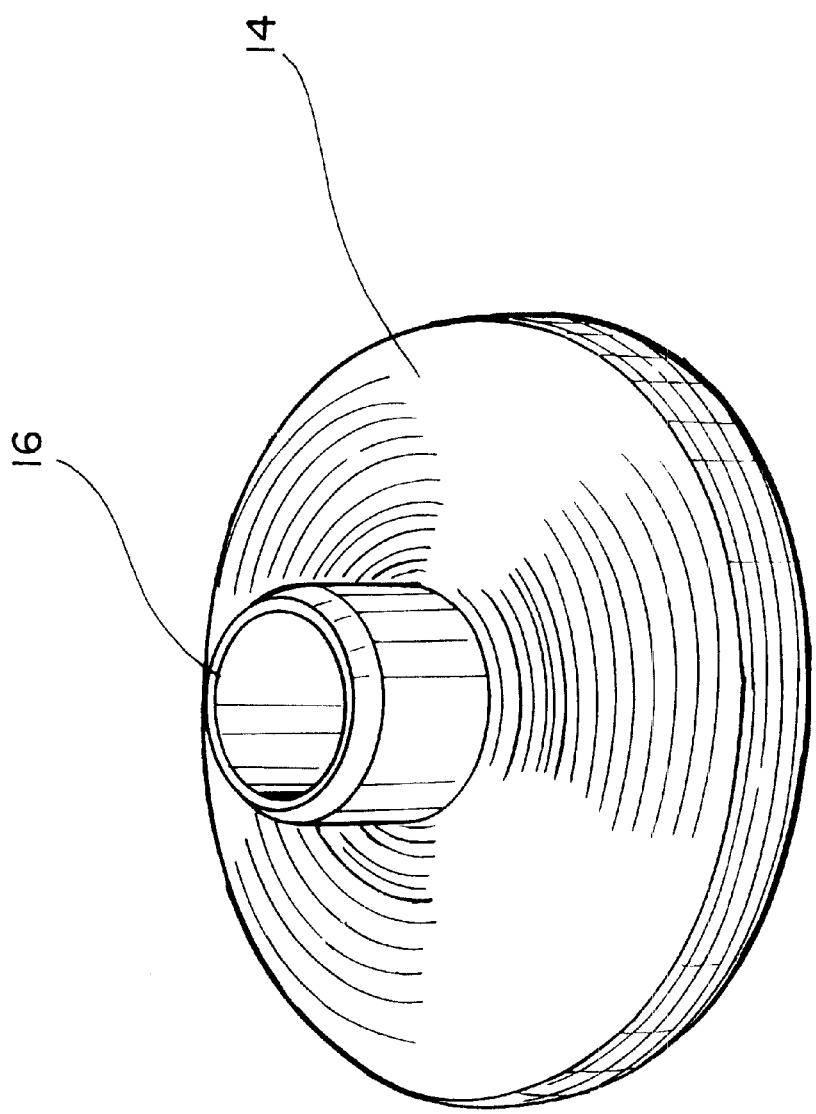
FIG. 3 is a side, perspective view of a roll of exemplary flanking material that is utilized in the apparatus shown in FIG. 1.

Referring to FIG. 1, a general, schematic diagram of an apparatus 10 for manufacturing articles utilizing a composite material having a high density of small particles, such as microspheres, in a matrix material is shown. Apparatus 10 includes two sources of flanking material 12 that, in an exemplary embodiment of the invention, comprise unidirectional stitch woven carbon fiber 14 that is rolled on a support member 16 as shown in FIG. 3. It should be understood that other materials are suitable for use as flanking materials such as, for example, glass fibers, unidirectional fibers, cross-woven fibers, matte fibers, fiber braid, carbon felt, plastics, leather, foil, metal, composites, thermoplastics, thermoset materials, resins, ceramics, vinyls and the like.

Apparatus 10 includes an optional feature of two pre-wetting stations 18 through which the flanking materials 12 are fed. When utilized, pre-wetting stations 18 apply an appropriate layer of resin on a surface of the flanking material 12 to aid in the application of composite material to the flanking material 12. It should be understood, however, that the pre-wetting stations 18 are optional features and are not required to make an article that is manufactured from the composite material disclosed in the CM application.

A mixer 20 and a pump 22 form a portion of apparatus 10. Mixer 20 contains a supply of composite material such as, for example, the various composite materials disclosed in the CM application. The particular composite material that is used depends upon the type of article that is to be manufactured as, for example, discussed in the CM application. Pump 22 provides the particular composite material that is used to a core material injector 24 that is utilized to introduce the composite material between the flanking material layers 12 at the input 26 of the pulltrusion die 28 as discussed in greater detail hereafter.

Figure 2:
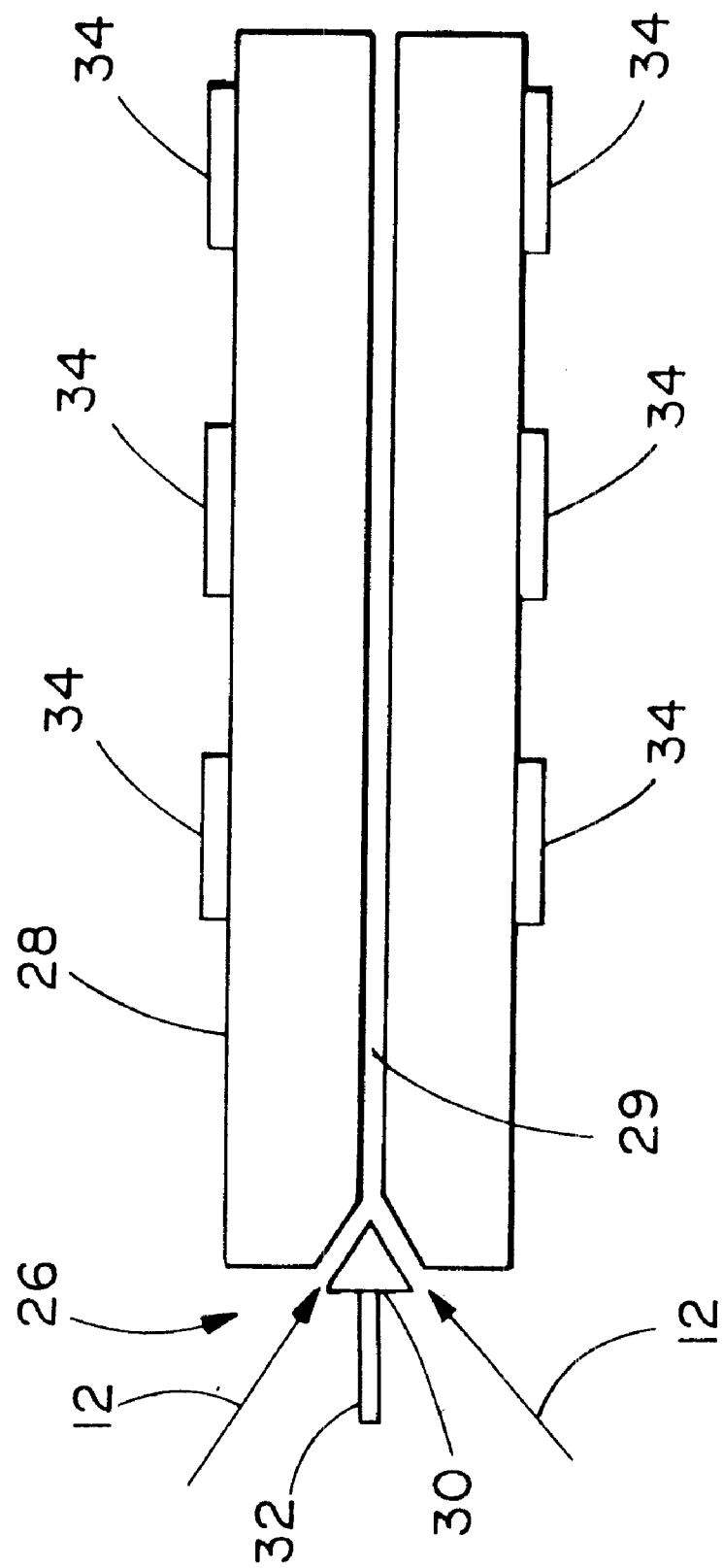
FIG. 2 is a side view of a pulltrusion die and the input of the pulltrusion die shown in FIG. 1.

Referring to FIG. 2, a side view of an embodiment of the pulltrusion die input region 26 and the pulltrusion die 28 is shown. In the illustrated embodiment, two layers of flanking material 12 are fed into the pulltrusion die input region 26 by means of a wedge member 30. Wedge member 30 includes a pipe 32 that is connected to pump 22 (FIG. 1) and through which the composite material from mixer 20 flows. Wedge member is utilized to introduce an appropriate amount of composite material between adjacent surfaces of the two flanking material layers 12 in a continuous in-line process.

Pulltrusion die 28 pulls the flanking material layers 12 through an operating chamber 29. Pulltrusion die 28 also includes a plurality of heaters 34 that are schematically shown in FIG. 2. Heaters 34 are used to apply an appropriate amount of heat into the operating chamber 29 to cure the composite material and, therefore, bond it to the flanking material layers 12 as they pass through pulltrusion die 28. The cured article is passed to the finishing station 36 (FIG. 1) for further processing, if desired.

Figure 4:
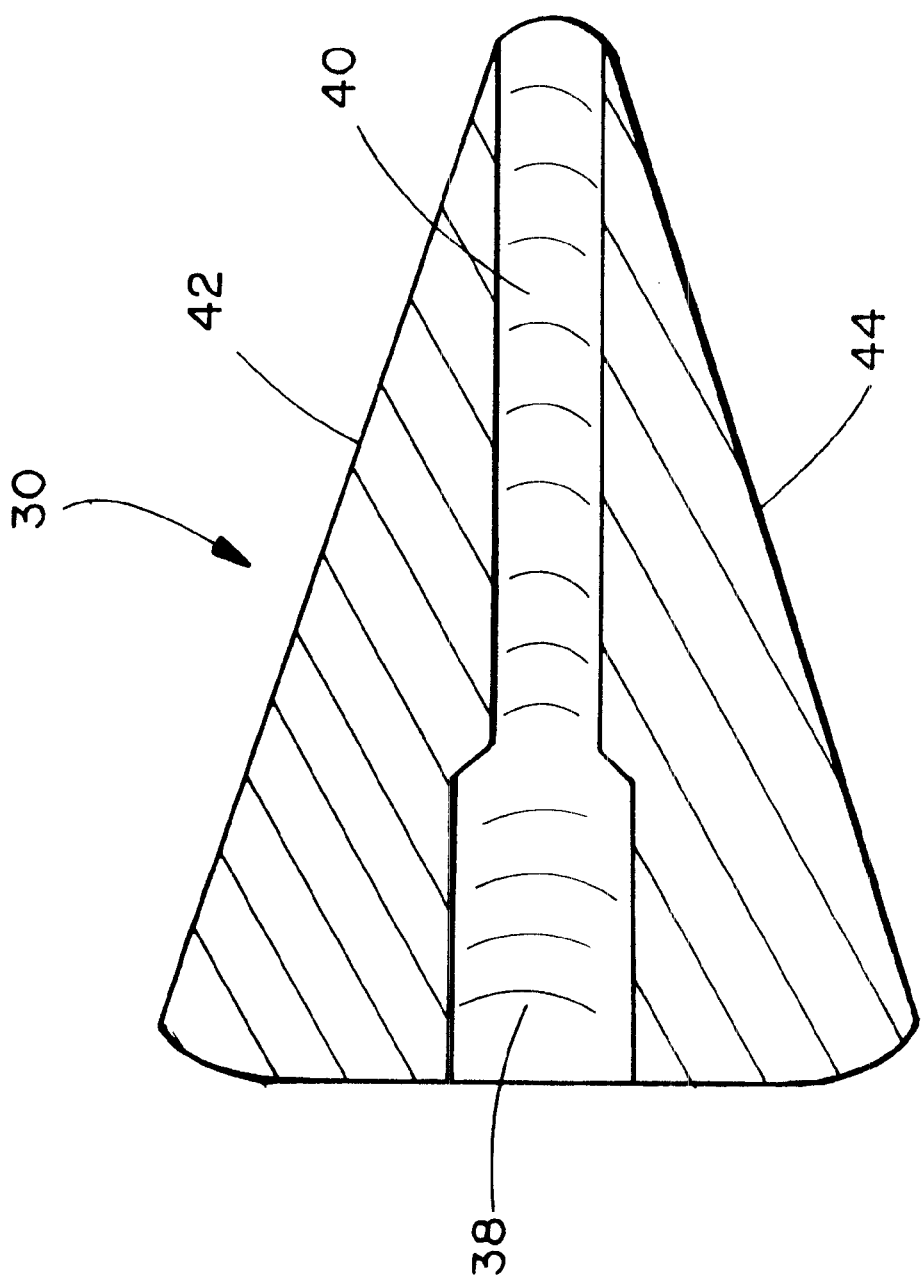
FIG. 4 is a side, sectional view of the core material injector shown in FIG. 1.

Referring to FIG. 4, a side, sectional view of the wedge member 30 is disclosed. In the illustrated embodiment, wedge member 30 includes a central input portion 38 that receives an end portion of pipe 32. Pipe 32 and central input portion 38 are joined together by, for example, the provision of corresponding threads on portion 38 and pipe 32. However, other methods of attachment may be utilized as readily apparent to those of ordinary skill in the art. A longitudinal channel 40 communicates with central input portion 38 to allow core material to be injected between the two layers of flanking material 12 shown in FIG. 2.

Wedge member 30 includes two inclined surfaces 42 and 44. In the illustrated embodiment, at least a portion of the flanking material 12 contacts the inclined surfaces 42 and 44 of wedge member 30. This allows, for example, the flanking material 12 to be guided into the pulltrusion die 28.

Stiffener bars for use in pallet applications are an example of an article that may be manufactured in accordance with the manufacturing process disclosed in this application. Existing pallets have been manufactured using plastics. However, plastic pallets have included additional reinforcement materials for heavy-duty applications. One existing plastic pallet includes five square steel tubes of a predetermined size as reinforcement inserts to meet government & grocery market specifications. Each pallet requires five tubes that cumulatively weigh about 27 pounds. One industry requirement is that the reinforcement bars must not exceed a certain deflection at the midpoint when a certain uniform weight load is distributed on a plastic pallet of a certain size.

An exploded view of a bar 46 that is made of the composite material disclosed in the CM application and that satisfies the deflection requirement mentioned above is shown in FIG. 5A. In this embodiment of the invention, the bar 46 includes a composite material core 48 having 48% by weight microspheres and 52% by weight resin and flanked with two layers 50 and 52 of linear flanking material. The new composite material bar 46 performed to the required stiffness with an overall weight reduction of about 25 pounds over steel (a 92% reduction). It should be understood that composite materials other than those discussed above are suitable for use in this application of the present invention.

Figure 5A:
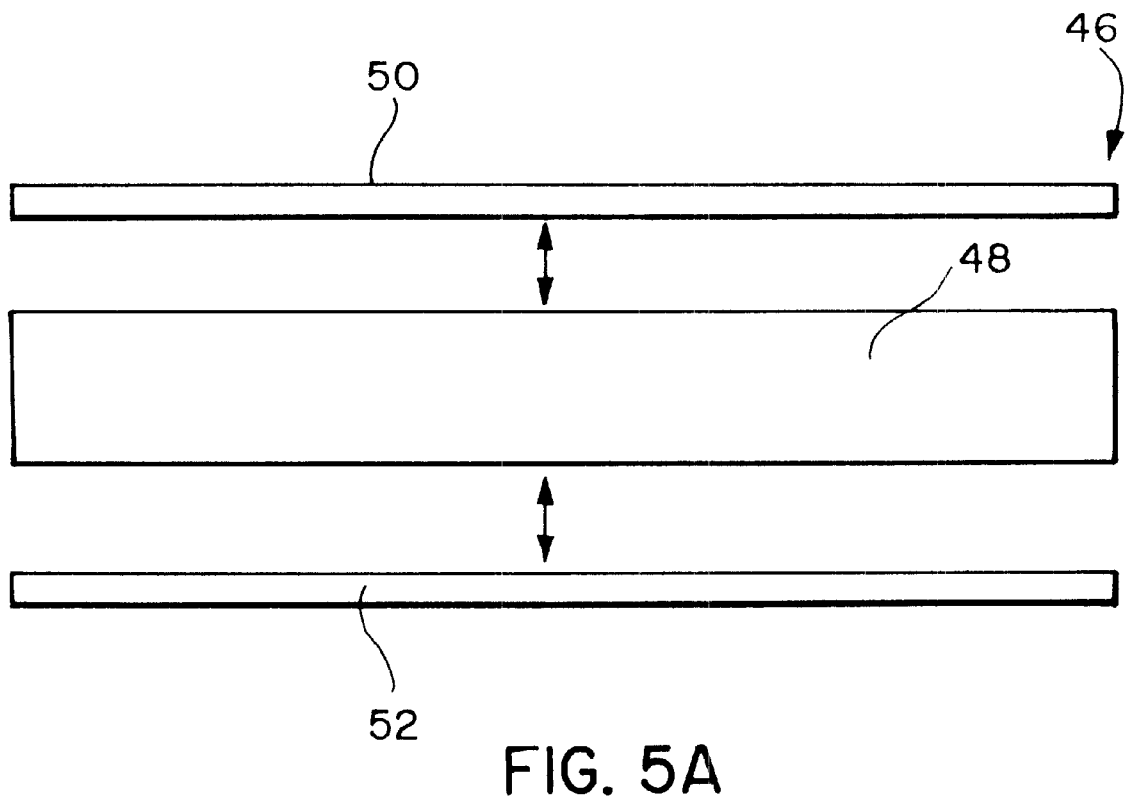
FIG. 5A is an exploded view of an exemplary article that is manufactured using the apparatus shown in FIG. 1.
Figure 5B:
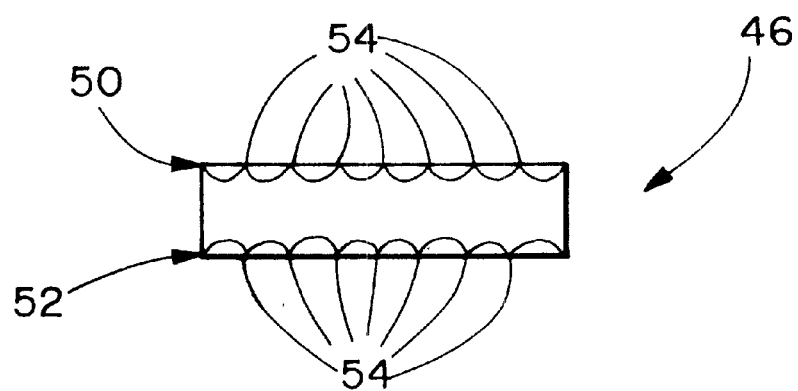
FIG. 5B is an end view of the article shown in FIG. 5A.

FIG. 5B shows an end view of the composite material bar 46 shown in FIG. 5A. In the illustrated embodiment of the invention, both flanking material layers 50 and 52 include a plurality of stitching lines 54 that divide the carbon fibers of the flanking layers 50 and 52 into a number of groups as shown. Another significant advantage of the present invention is that, for example, passing the flanking material layers 50 and 52 under tension from the pulltrusion die 26 and over at least a portion of the inclined surfaces 40 and 42 of the wedge member 30 generally enhances the perpendicular orientation of the individual carbon fibers with respect to the outside edges of each flanking material layer. This causes, for example, the stiffener bar to be stronger and generally less susceptible to breaking.

One significant advantage of the inventive manufacturing process disclosed herein is that it is especially suited for commercial applications, and that it allows large numbers of composite material articles to be manufactured in a cost efficient and effective manner. For example, in the case that pallet stiffener bars are to be manufactured, finishing station 36 cuts the cured article exiting from the pulltrusion die 26 to the desired size for the particular pallet stiffener bar application desired.

Figure 6:
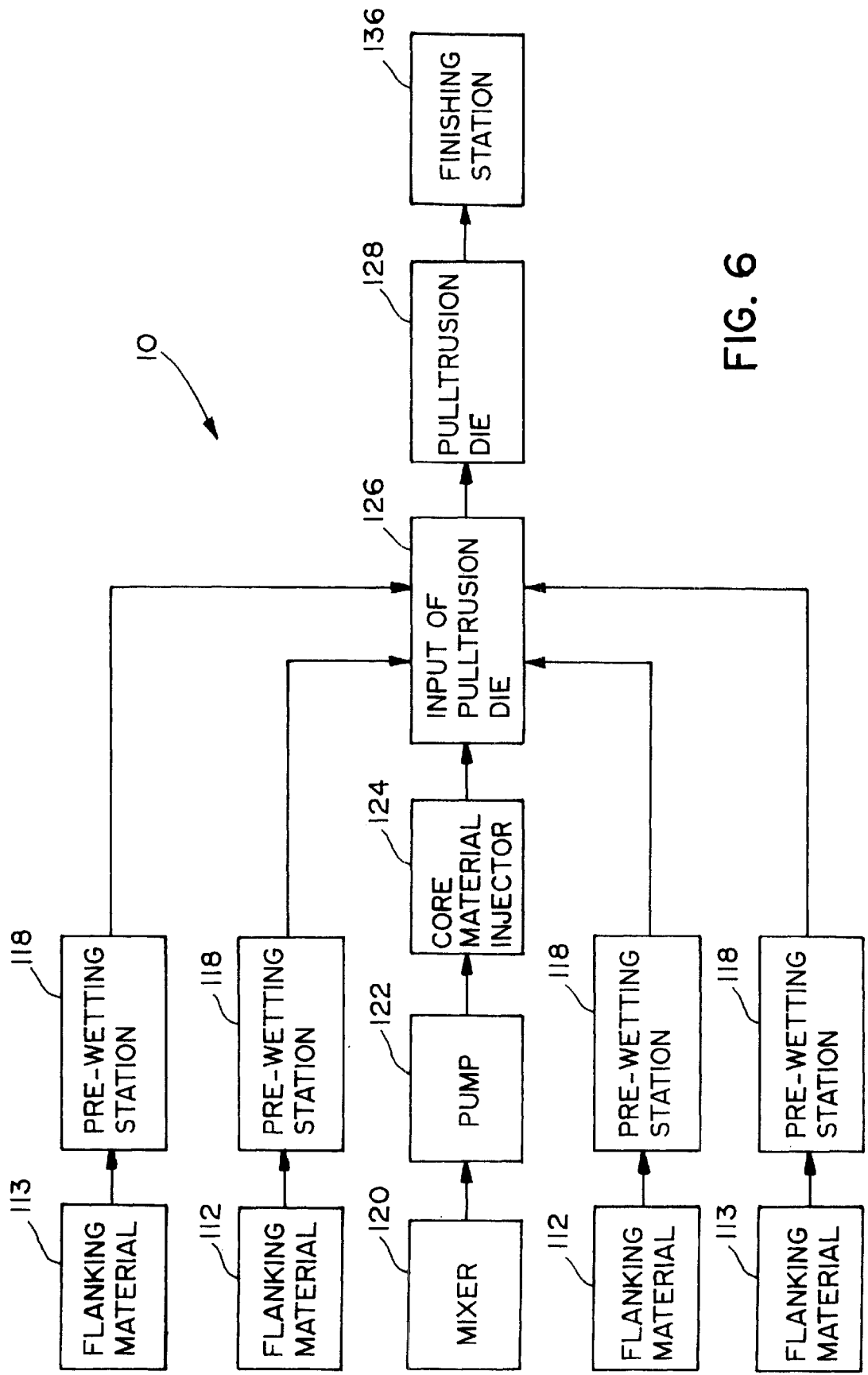
FIG. 6 is a general, schematic diagram of a second embodiment of an apparatus for manufacturing articles using a composite material having a high density of small particles, such as microspheres, in a matrix material, wherein at least two layers of flanking material that are disposed in a generally non-parallel relationship to each other are utilized.

Referring to FIG. 6, a general, schematic diagram of an apparatus 110 for manufacturing articles utilizing a composite material having a high density of small particles, such as microspheres, in a matrix material is shown. Apparatus 110 includes two sources of flanking material 112 and two sources of flanking material 113 (i.e., four total sources of flanking material). Flanking material sources may comprise, in an exemplary embodiment of the invention, uni-directional stitch woven carbon fiber provided on a storage or support member as shown in FIG. 3, or any other suitable material such as, for example, glass fibers, uni-directional fibers, cross-woven fibers, matte fibers, fiber braid, carbon felt, plastics, leather, foil, metal, composites, thermoplastics, thermoset materials, resins, ceramics, vinyls, fiberglass, and the like.

Apparatus 110 includes an optional feature of four pre-wetting stations 118 through which the flanking materials 112 and 113 are fed. When utilized, pre-wetting stations 118 apply an appropriate layer of resin on a surface of the flanking materials 112 and 113 to aid in the application of composite material to the flanking materials 112 and 113. It should be understood, however, that the pre-wetting stations 118 are optional features and are not required to make an article that is manufactured from the composite material disclosed in the CM application.

A mixer 120 and a pump 122 form a portion of apparatus 110. Mixer 120 contains a supply of composite material such as, for example, the various composite materials disclosed in the CM application. The particular composite material that is used depends upon the type of article that is to be manufactured as, for example, discussed in the CM application. Pump 122 provides the particular composite material that is used to a core material injector 124 that is utilized to introduce the composite material between the flanking material layers 112 and 113 at the input 126 of the pulltrusion die 128 as discussed in greater detail hereafter.

Figure 7:
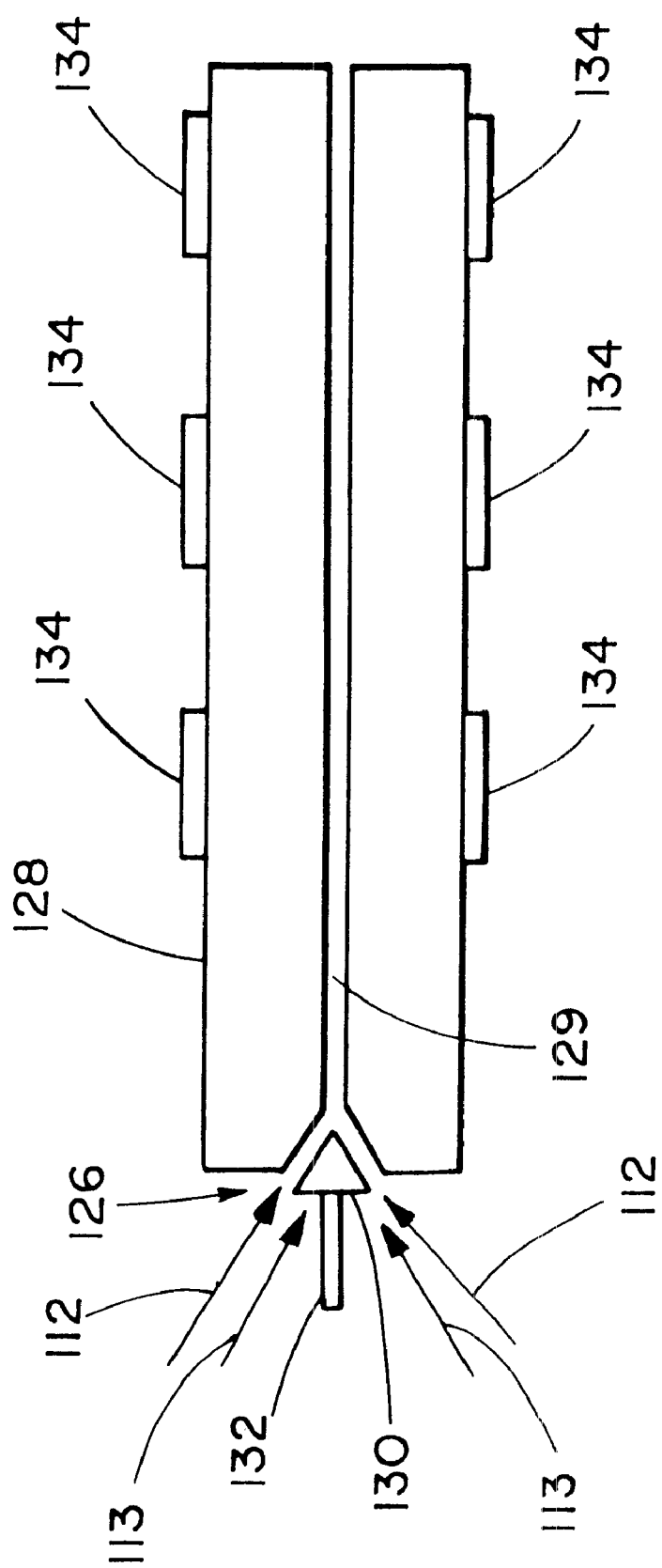
FIG. 7 is a side view of a pulltrusion die and the input of the pulltrusion die shown in FIG. 6.

Referring to FIG. 7, a side view of the pulltrusion die input region 126 and the pulltrusion die 128 is shown. In the illustrated embodiment, two layers of flanking material 112 and two layers of flanking material 113 are fed into the pulltrusion die input region 126 by means of a wedge member 130. Wedge member 130 includes a pipe 132 that is connected to pump 122 (FIG. 6) and through which the composite material from mixer 120 flows. Wedge member is utilized to introduce an appropriate amount of composite material between the space defined between two flanking material layers 112 and the flanking material layers 113 in a continuous inline process.

Pulltrusion die 128 pulls the flanking material layers 112 and 113 through an operating chamber 129. Pulltrusion die 128 also includes a plurality of heaters 134 that are schematically shown in FIG. 7. Heaters 134 are used to apply an appropriate amount of heat into the operating chamber 129 to cure the composite material and, therefore, bond it to the flanking material layers 112 and 113 as they pass through pulltrusion die 128. The cured article is passed to the finishing station 136 (FIG. 6) for further processing, if desired.

Figure 8:
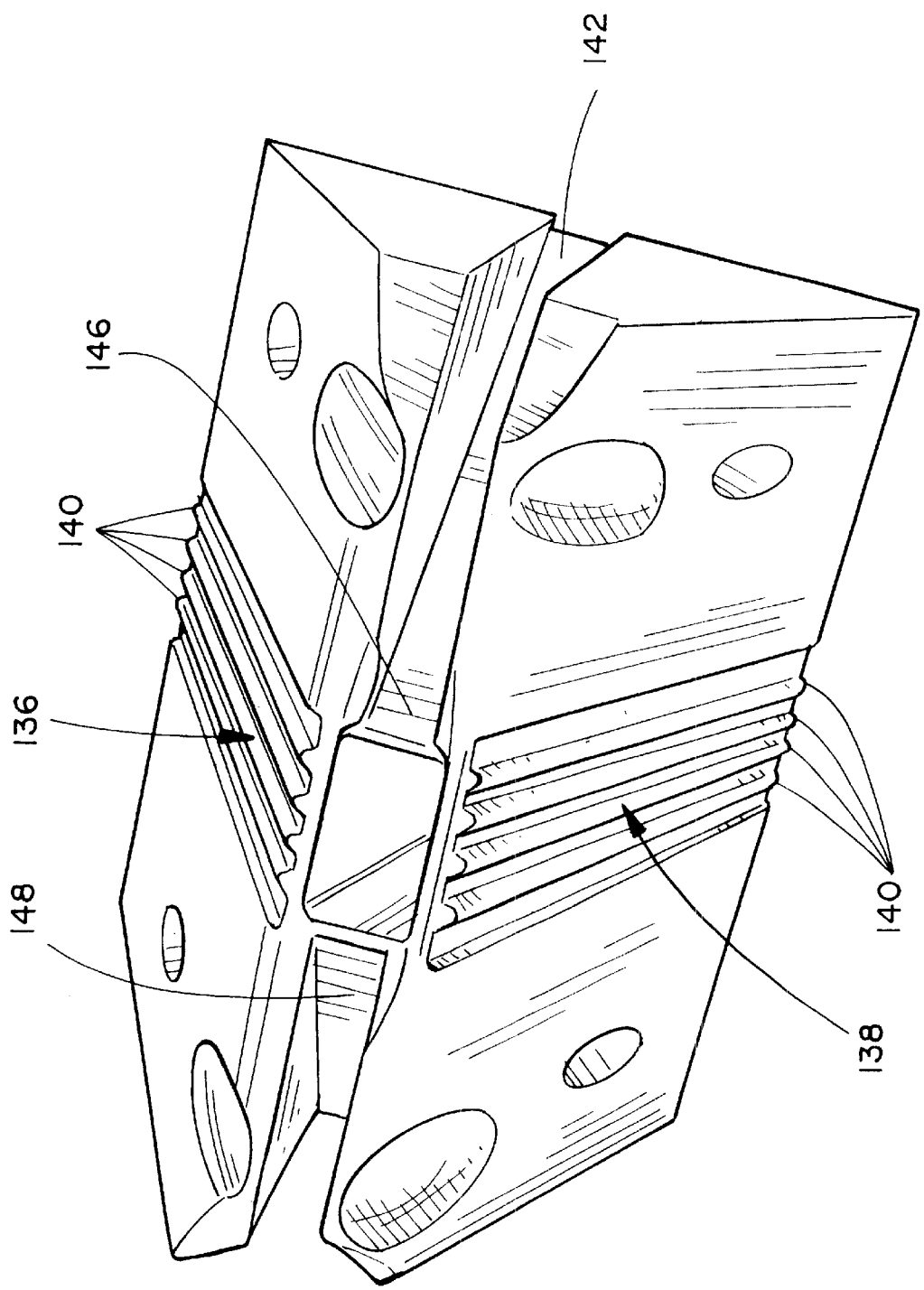
FIG. 8 is a bottom, perspective view of a first embodiment of the core material injector shown in FIG. 6.

FIG. 8 is a bottom, perspective view of a first embodiment of the core material injector shown in FIG. 6. In particular, wedge member 130 includes two inclined surfaces 136 and 138 that are defined on the top and bottom of wedge member 30 as shown. Two layers of flanking material 112 are guided into the operating chamber 129 of the pulltrusion die 128 in a like manner to, and as discussed above with regard to the embodiment shown in FIG. 4. An optional feature of the present invention is that a number of raised ridges or combs 140 are defined on each of the inclined surfaces 136 and 138. One advantage provided by the combs 140 is that the combs 140 generally increase axial alignment of any fibers that are present in the flanking material layers 112 as they pass over at least a portion of the inclined surfaces 136 and 138. It should be understood that combs 140 are an optional feature that is not required by the present invention, and that it is contemplated that the combs 140 are utilizable in connection with the embodiment of the invention shown in FIG. 4, as well as the embodiments of the invention that are discussed in greater detail hereinafter.

Wedge member 130 includes two channels 142 and 144 that are formed in the two sides or ends of the wedge member 130. Each channel 142 and 144 includes a corresponding inclined surface 146 and 148. One aspect of the present invention is that the flanking material layers 113 are guided into the operating chamber 129 of the pulltrusion die 128 at least in part by the passage of the flanking material layers 113 through the channels 142 and 144. The flanking material layers 113 also are guided into the operating chamber 129 by at least some contact with inclined surfaces 146 and 148.

Figure 9:
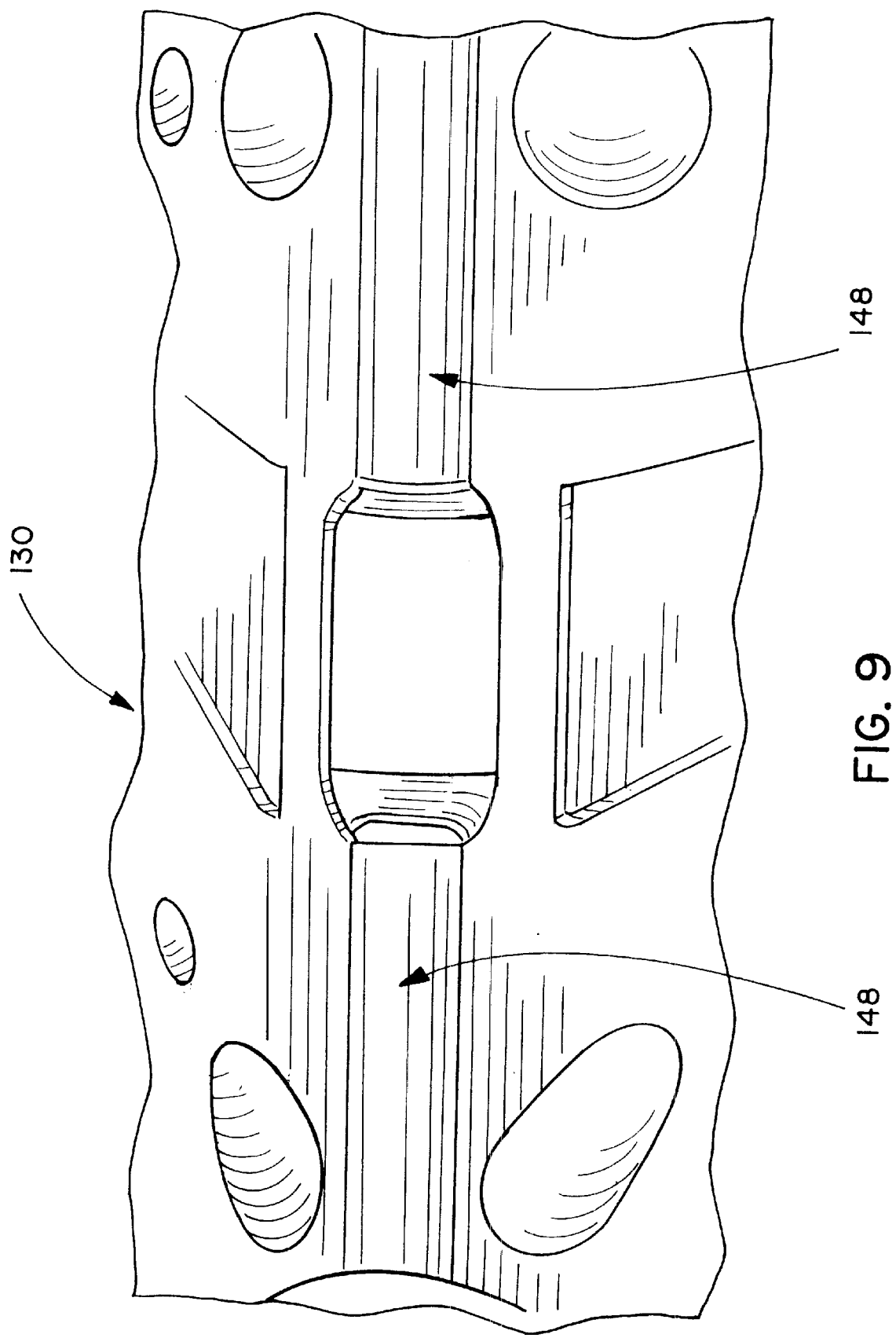
FIG. 9 is a front, perspective view of a second embodiment of the core material injector shown in FIG. 6.
Figure 10:
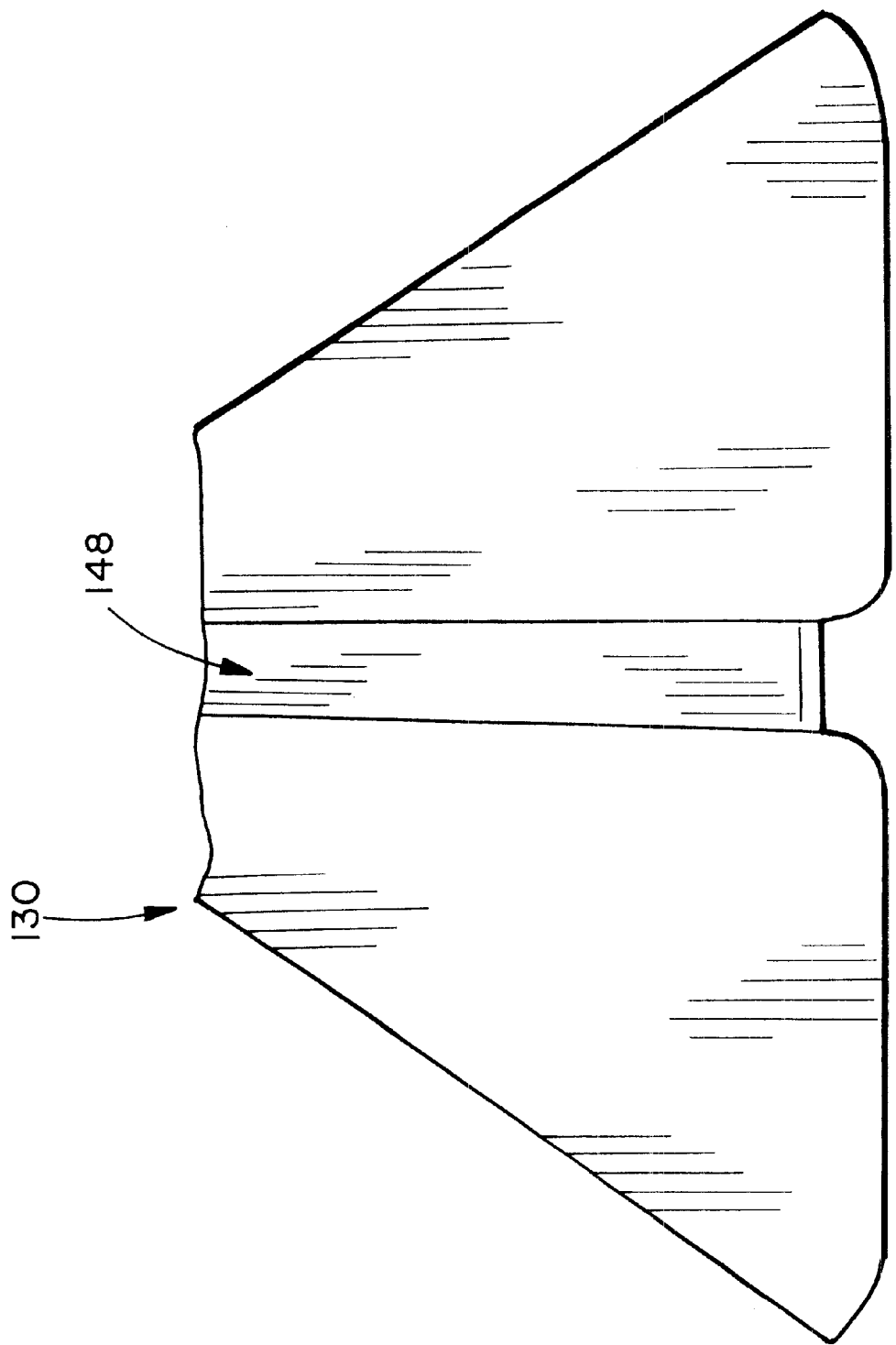
FIG. 10 is a is a side, perspective view of the core material injector shown in FIG. 9.

FIG. 9 is a front, perspective view of a second embodiment of the core material injector 124 shown in FIG. 6. FIG. 10 is a is a side, perspective view of the core material injector 124 shown in FIG. 9. FIGS. 9 and 10 illustrate that a guiding mechanism 148 is inserted into the channels 142 and 144. One aspect of the present invention is that guiding mechanism 148 serves to ensure that the flanking material layers 113 are guided into the operating chamber 129 of the pulltrusion die 128 in a desired relationship with respect to the flanking material layers 112. In the illustrated embodiment of the invention, the guiding mechanism comprises an angled member that is mounted in the channels 142 and 144. It should be understood, however, that the utilization of the guiding mechanism 148 is an optional feature of the present invention.

Figure 11:
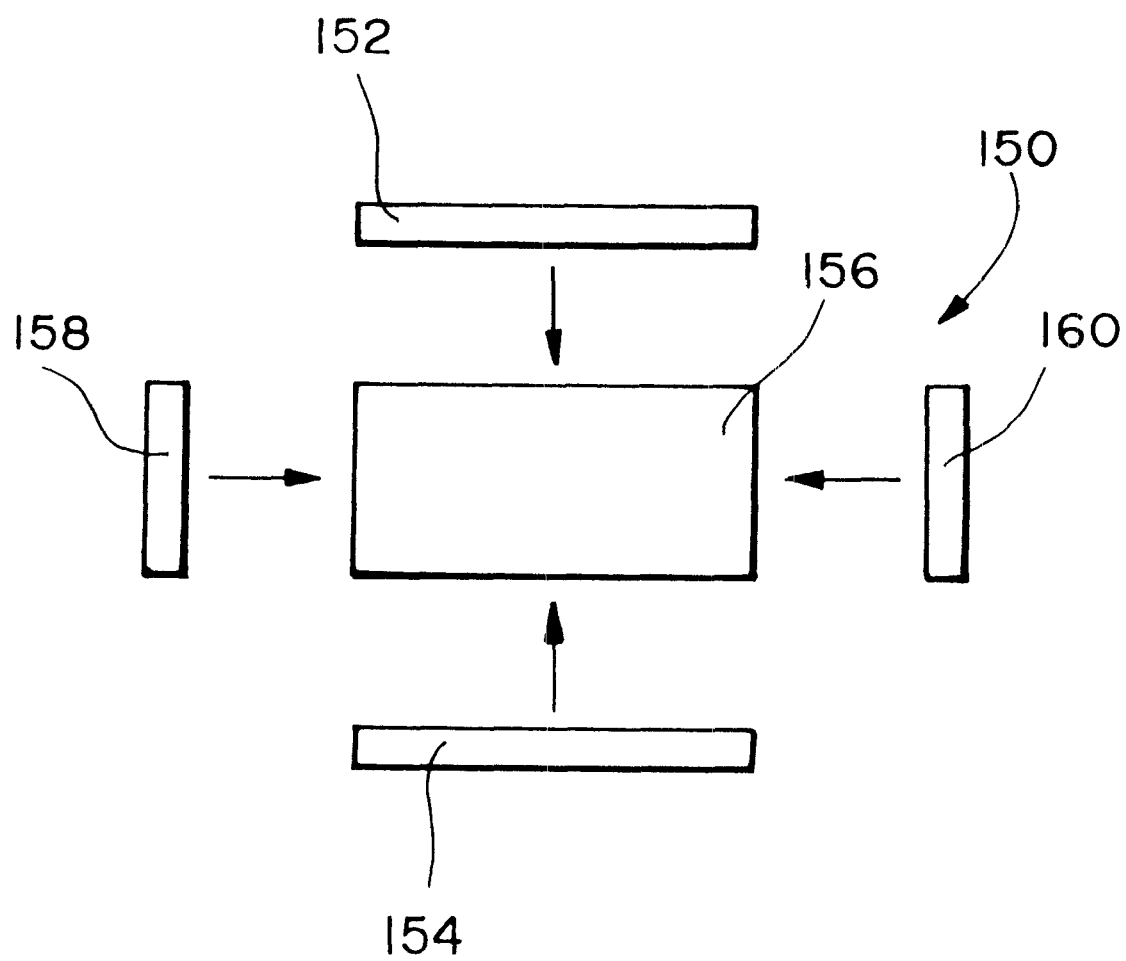
FIG. 11 is an exploded view of an exemplary article that is manufactured using the apparatus shown in FIG. 6.

FIG. 11 is an exploded view of an exemplary article 150 that is manufactured using the apparatus shown in FIG. 6. Article 150 includes two layers of flanking material 152 and 154 that are affixed to the top and bottom, respectively, of a central core 156 that is formed from a composite material as discussed above with regard to FIGS. 5A and 5B. Two flanking material layers 158 and 160 are secured to the side or ends of the central core 156 as shown in FIG. 11. Materials suitable for use as flanking material layers 152, 154, 158, and 160 are discussed above with regard to the embodiments of the invention illustrated in FIGS. 1–6. For example, in an exemplary application of the present invention, flanking material layers 152 and 154 are formed from uni-directional stitch woven carbon fiber, whereas flanking material layers 158 and 160 are formed from fiberglass rolls. It should be understood that the utilization of combs 140 on wedge member 130 provides significant advantages when used in connection with fiber materials such as uni-directional stitch woven carbon fiber because, for example, the strength and integrity of the resulting article is increased due to the enhanced relationship of the fibers that is caused by contact with at least a portion of the combs 140.

Figure 12:
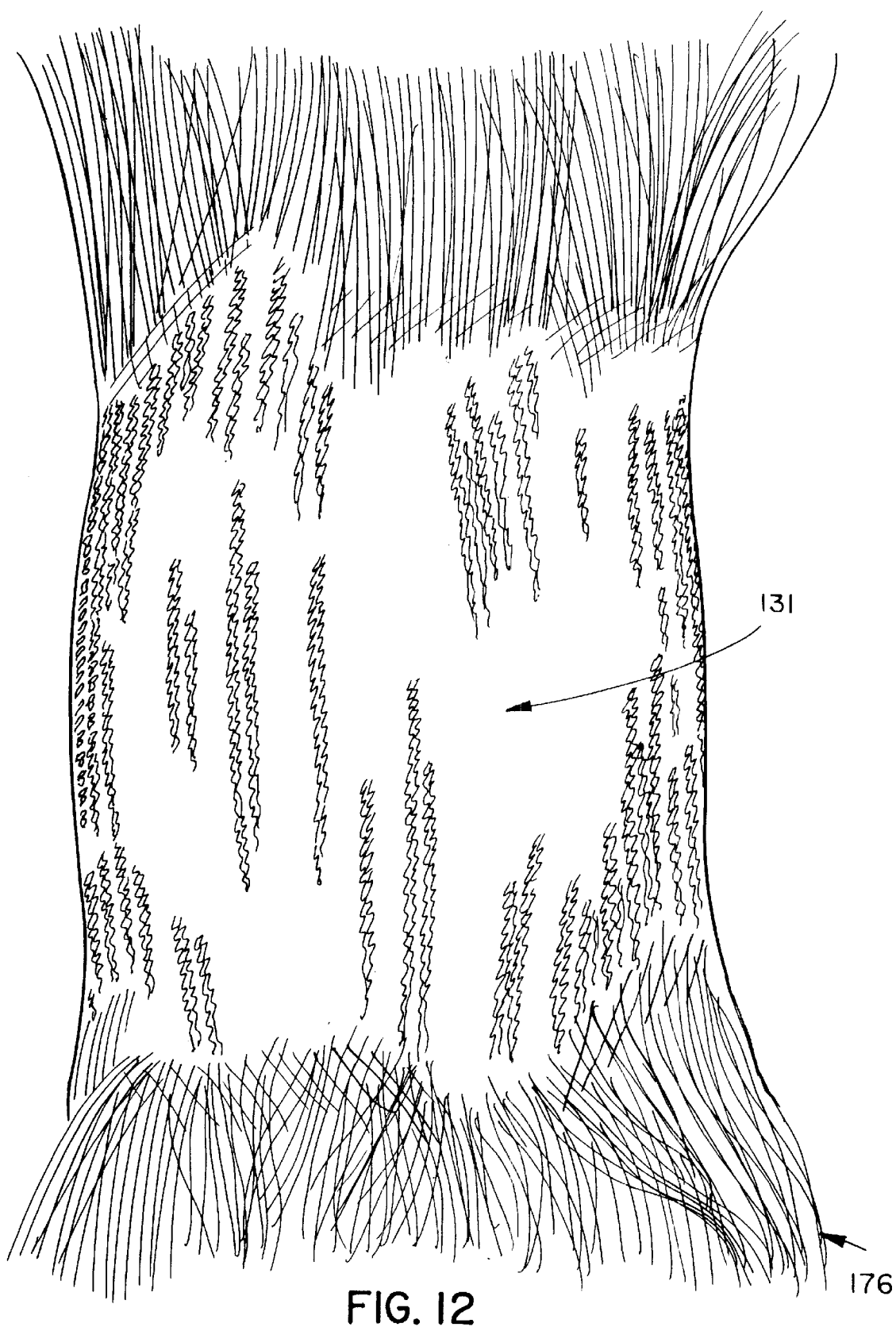
FIG. 12 is a side view of an expandable woven sock.

An additional method for manufacturing articles using the composite materials disclosed in the CM application is discussed in greater detail hereafter with regard to FIGS. 12–15b. Referring to FIG. 12, a front view of an expandable woven sock 151 is shown. Sock 151 is formed from numerous strands 152 of fiberglass, polymer, or other suitable material. The strands 152 are woven together to form an article capable of forming an inner space, pocket, or cavity. Expandable woven socks that are suitable for use in connection with the aspect of the invention disclosed herein are commercially available on the market from A & P Technologies, a corporation based in Cincinnati, Ohio. The dimensions and other characteristics of sock 151 are directly related to the physical characteristics such as, for example, the size of the article that is to be manufactured.

Figure 13:
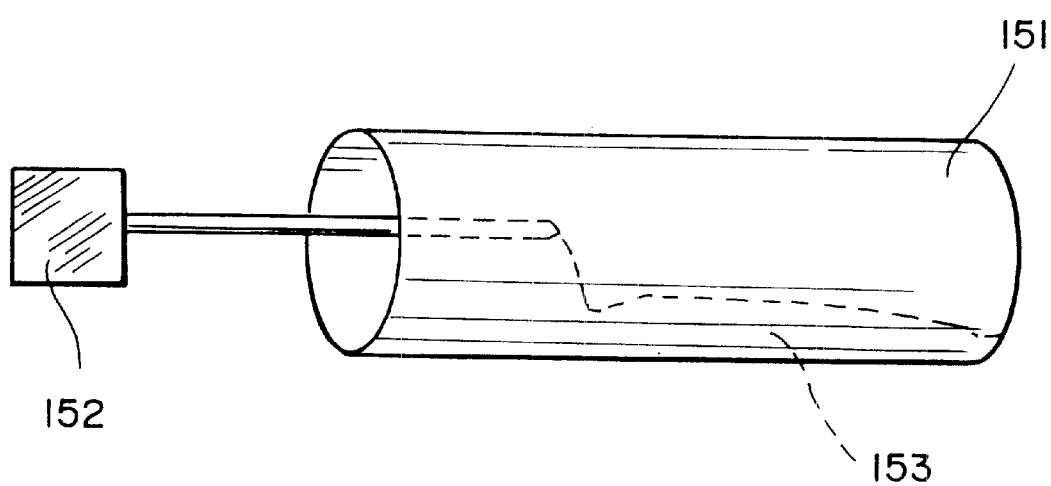
FIG. 13 is a general schematic view that shows an exemplary method of injecting a composite material into the expandable woven sock shown in FIG. 12.

Referring to FIG. 13, a general schematic of one embodiment of a method for injecting a desired amount of a composite material into sock 151 is shown. In the illustrated embodiment of the invention, a core material injector 152 includes a long, tubular portion that is used to inject a composite material 153 in a space defined by the expandable woven sock 151.

Figure 14:
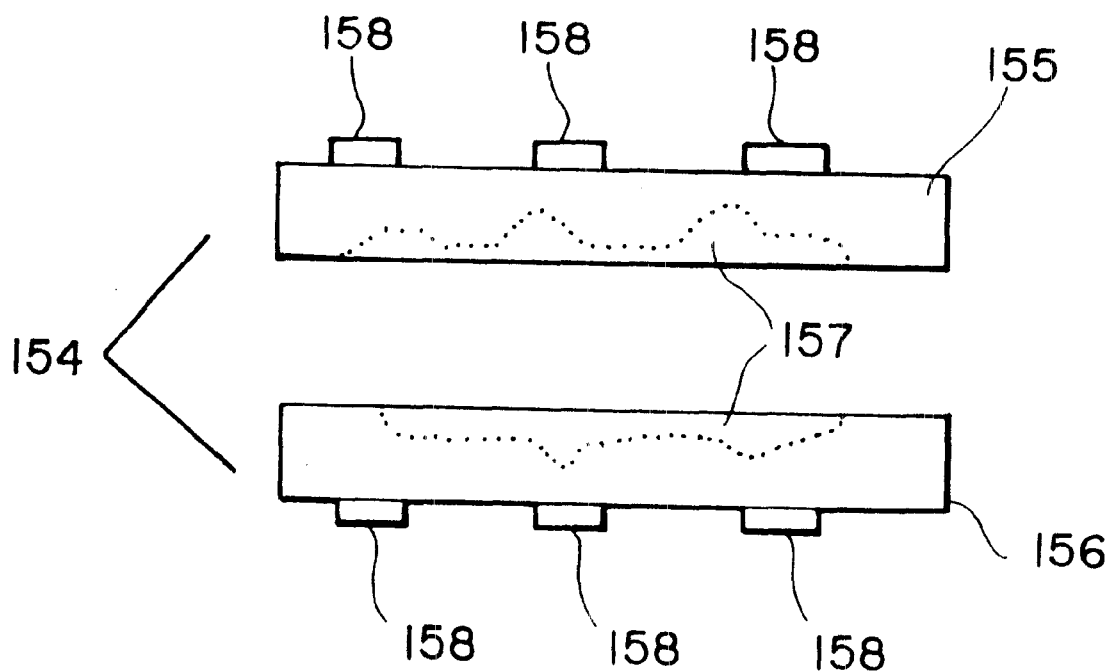
FIG. 14 is a side view of an exemplary mold that is to manufacture articles utilizing the expandable woven sock shown in FIG. 12.

FIG. 14 is a side view of an exemplary mold 154 that is to manufacture articles utilizing the expandable woven sock shown in FIG. 12. Mold 154 is used to form a desired product. In the illustrated embodiment of the invention, mold 154 comprises a compression mold. Mold 154 includes first and second mold halves 155 and 156 that are movable with respect to each other. In the closed position of mold 154, a article defining cavity 157 is defined between the mold halves 155 and 156. The shape of the article defining cavity 157 of mold 154 corresponds to the shape of the article that is to be manufactured. Mold 154 includes a number of heating units 158 that are used to heat the sock 151 and composite material 153 and, therefore, cure the composite material.

In accordance with the embodiment of the present invention disclosed in FIGS. 13–14, articles of any desired shape can be formed as discussed in greater detail hereafter. First, a desired amount of a composite material 153 is inserted into a spaced defined inside the expandable woven sock 151. The shape of the sock 151 and the amount of composite material 153 inserted into the sock vary as a function of the physical characteristics of the article to be formed. The sock 151 and composite material 153 are then inserted into the article defining cavity 157 of mold 154 when the mold 154 is in an open position. However, it should be understood that the composite material 153 may be injected into sock 151 while the sock 151 is disposed in the article defining cavity.

After the composite material 153 and sock 151 are disposed in the article defining cavity 157, the mold halves 155–156 close. In the illustrated embodiment of the invention, this compresses and heats the composite material 153 and the sock 151. The compression and heating causes the composite material to "wet out" the sock 151 and, therefore, provide a generally smooth surface of composite material on the article to be formed. After a predetermined amount of time that varies as a function of numerous factors including, for example, the amount of composite material 153 that is used, the mold 154 is opened, and the cured composite material 153 filled sock 151 is removed from the mold. If desired, various finishing operations can then be performed such as, for example, painting or machining operations.

Figure 15B:
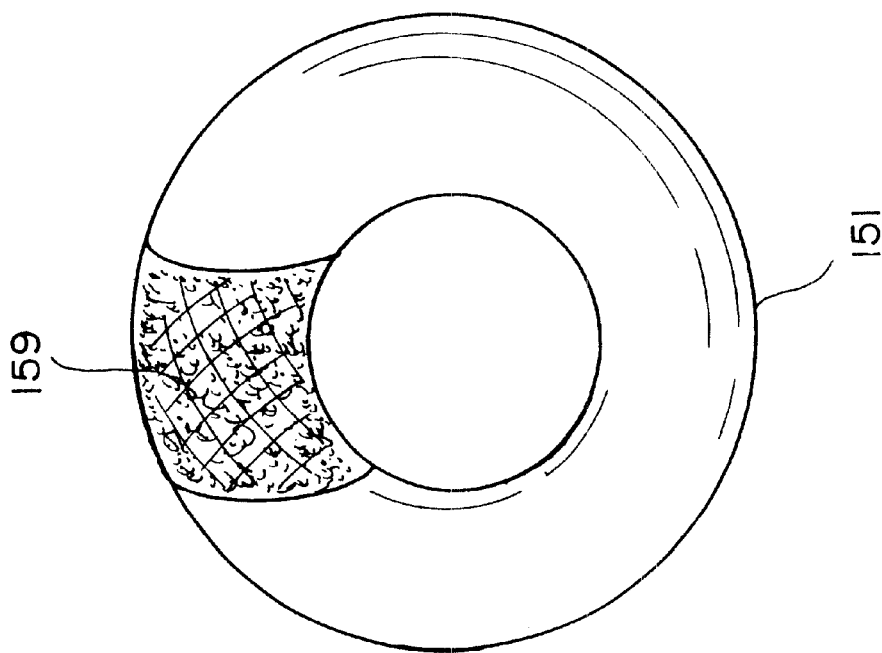
FIGS. 15a and 15b are side views of an expandable woven sock that is manipulated into a generally annular shape.
Figure 15A:
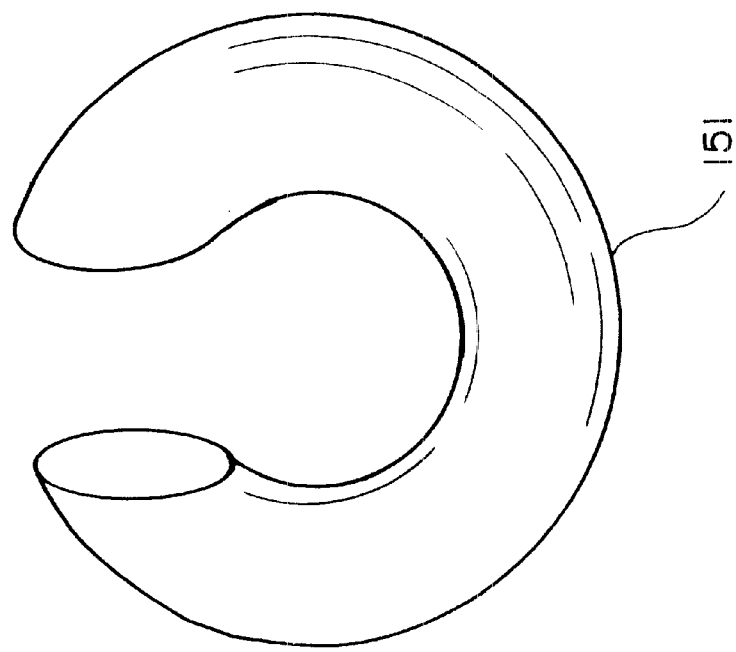

FIGS. 15a–15b illustrate a particular exemplary application of this embodiment of the present invention. In particular, FIGS. 15a–15b illustrate that an expandable woven sock 151 can be filled with composite material, and then folded over so that at least some of one end portion of the sock 151 is inserted inside the other end portion of sock 151 to create an overlap 159. This allows, for example, generally annular articles to be formed of the composite material disclosed in the CM application. After the sock 151 is filled with a desired amount of composite material and is formed into a generally annular shape as, for example, shown in FIG. 15b, the resulting combination is then compressed and heated to produce a resulting cured article in a generally annular form as generally discussed above with regard to FIGS. 12–14.

Figure 16:
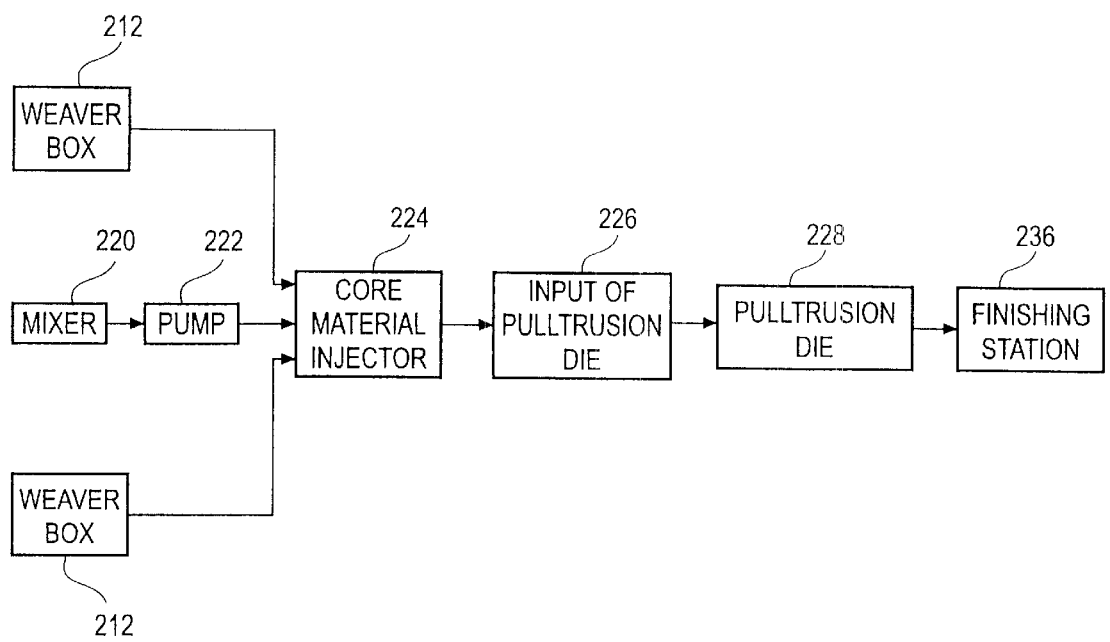
FIG. 16 is a general, schematic diagram of a third embodiment of an apparatus for manufacturing articles using a composite material having a high density of small particles such as microspheres in a matrix material, wherein the composite material is inserted into a space defined between two woven socks and processed to create a generally annular shaped final product.

Referring to FIG. 16, a general, schematic diagram of an alternate embodiment of an apparatus 210 for manufacturing articles utilizing a composite material having a high density of small particles, such as microspheres, in a matrix material is shown. In the illustrated embodiment, apparatus 210 includes two weaver boxes 212 that create expandable woven socks, as shown in FIG. 12.

A mixer 220 and a pump 222 form a portion of apparatus 210. Mixer 220 contains a supply of composite materials, such as, for example, the various composite materials disclosed in the CM application. The particular composite material that is used depends upon the type of article that is to be manufactured as, for example, discussed in the CM application.

Figure 17:
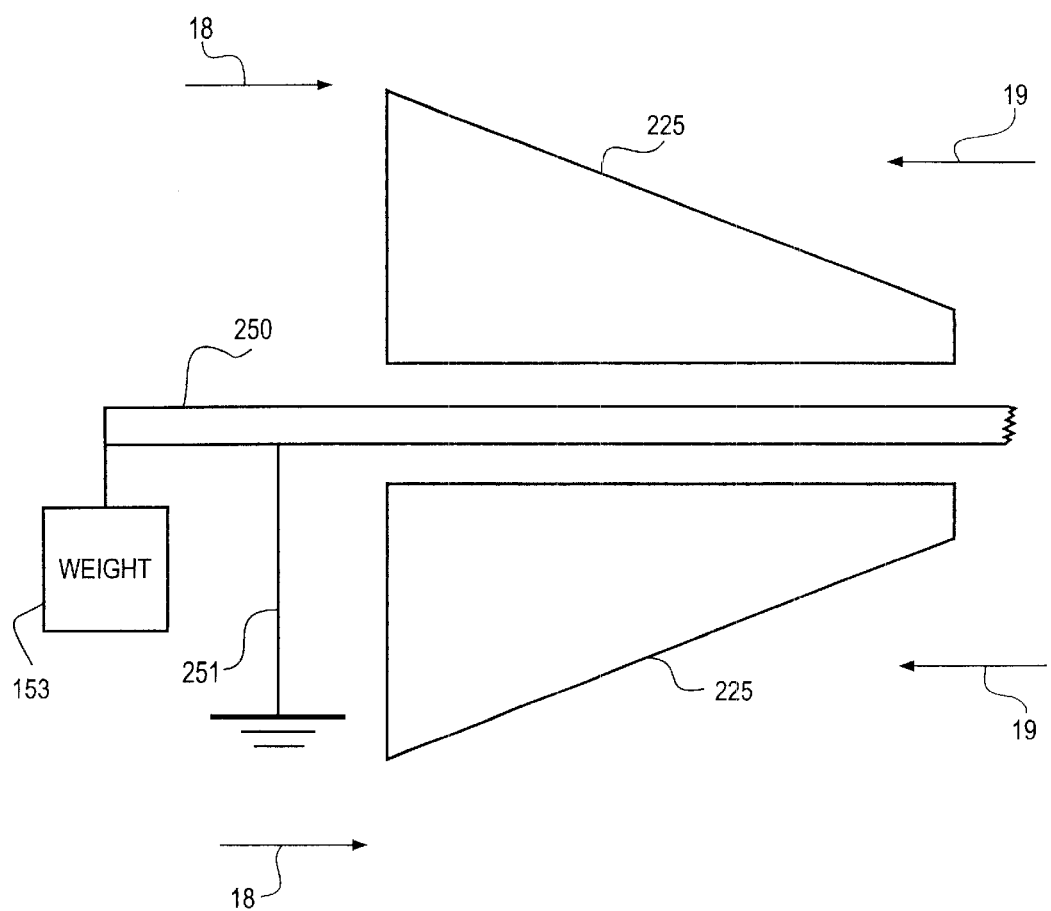
FIG. 17 is a side, cross-sectional view of the core material injector apparatus represented in FIG. 16.

Pump 222 provides the particular composite material that is used to a core material injector 224 that is utilized to introduce the composite material between the product 212 of the first weaver box and the product 212 of the second weaver box at the conical receiving area 225 around mandrel 250 (shown in FIG. 17) at the core material injector 224. Although the FIG. 17 shows a conical shaped receiving area, it should be understood that any divider may be substituted. This is representative of a divider which creates a separation between the two weaver socks being introduced into the process. A separation between the socks is used to permit the injection of the core material between the two layers of expandable socks. Pump 222 introduces the mixture between the two layers of woven sock as they are pulled through the core injector 224 and through the input of pulltrusion die 226 by pulltrusion die 228.

Referring to FIG. 17, a side, cross-sectional view of the core material injector apparatus 224 is shown. In the illustrated embodiment, one weaver sock is wrapped around the outer layer of the cone around fixed mandrel 250 while the other weaver sock is wrapped in the inner layer of the cone. As stated above, the conical receiving area 225 illustrated, while preferred, is not required. It serves as a separator or place-holder between the weaver socks. However, one skilled in the art could use alternative means to separate the weaver socks in order to inject in the composite material between the layers.

Fixed mandrel 250 is preferentially a steel tube, fixed in place by stand 251, which rests on the ground. Weight 253 is attached to one end of mandrel 250 to maintain balance (as a counter balance) as the process is run. Fixed mandrel 250 runs through the process from at least the core material injector to at least the finishing station, thus assisting in the creation of a generally annular, nonsolid (e.g. with a center hole) product. Although illustrated as having a more circular shape, mandrel 250 can be a tube of any preferred shape or diameter. Mandrel 250 can pivot about an axis that operatively interacts with pulltrusion die 228 and input of pulltrusion die 226 to facilitate the production of the final product.

As would be understood by one skilled in the art, the mandrel 250 assists in the creation of the center hole in the final product. It is generally used in the illustrated embodiment to prevent the weaver socks from collapsing upon each other. However, as would be understood by one skilled in the art, this process does not necessarily require the use of a mandrel to create the center hole, but rather may use alternative means to maintain the shape of the weaver socks as the core material is injected between the two layers and solidified through the process.

Figure 18:
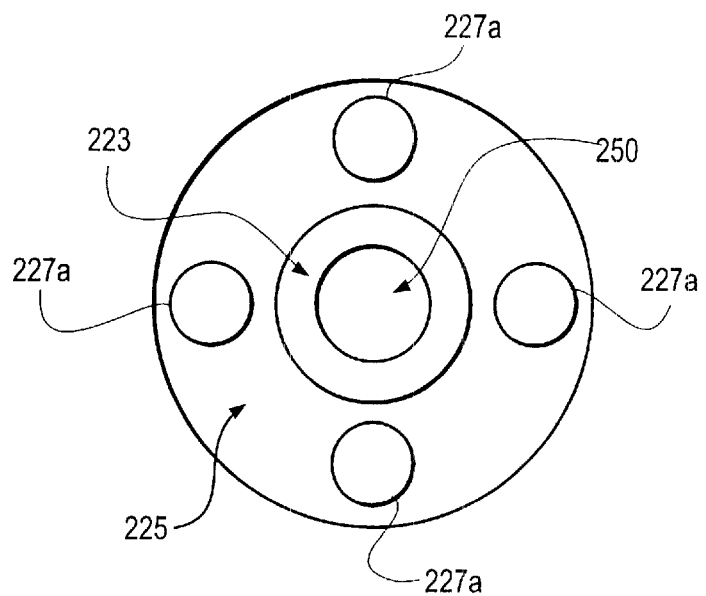
FIG. 18 is a cross-sectional view of one of the ends of the core material injector apparatus as represented in FIG. 17.

FIG. 18 shows a cross-sectional view of one of the ends of the core material injector apparatus as represented in FIG. 17. Mandrel 250 is illustrated in the center, surrounded by hole 223 and conical receiving area 225. In the conical receiving area 225, four entrance areas 227a are illustrated. Entrance areas 227a are usually threaded, but such threading is not required. Entrance areas 227a work in conjunction with the pump 222, the core material injector 224, and the input of pulltrusion die 226 to receive via hose-like apparatus the core material. Although four holes are illustrated, this is not a requirement. At least one hole is required to supply the core material to the area between the woven socks. Multiple holes facilitate the smooth, even distribution of the material.

Figure 19:
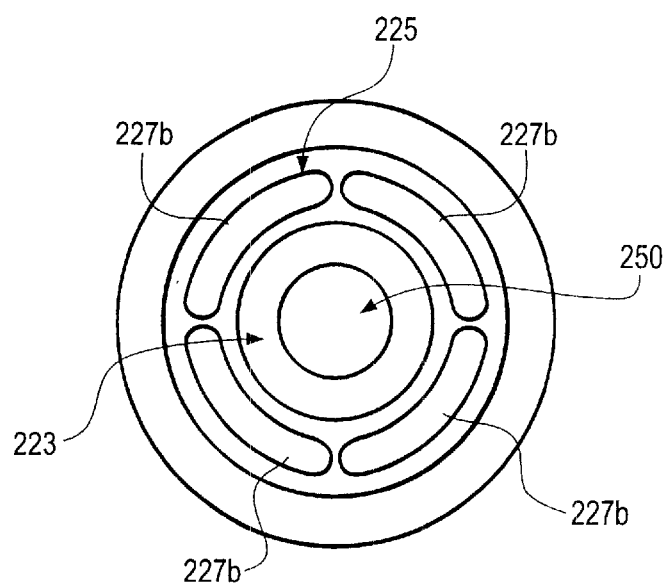
FIG. 19 is a cross-sectional view of the other end of the core material injector apparatus as represented in FIG. 17.

FIG. 19 is a cross-sectional view of the other end of the core material injector apparatus as represented in FIG. 17. It shows mandrel 250, surrounded by hole 223 and conical receiving area 225. In the illustrated embodiment, there are four discharge areas 227(b) that match-up with the four entrance areas 227a. The discharge areas 227(b) are elongated so as to facilitate the even distribution of the core material. As stated above, at least one discharge area is required to supply the core material to the are between the woven socks. Multiple discharge areas facilitate the smooth, even distribution of the material. There should be an equal number of discharge areas to entrance areas working in conjunction.

Figure 20:
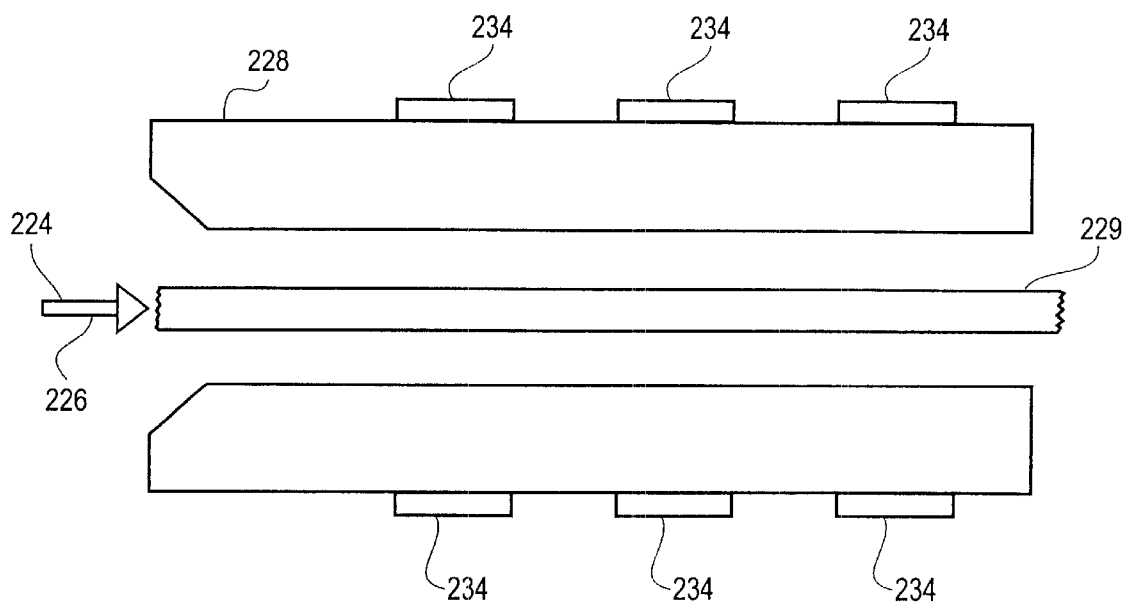
FIG. 20 is a side, cross-sectional view of the pulltrusion die and the input of the pulltrusion die shown in FIG. 16.

Referring to FIG. 20, a side, cross-sectional view of the pulltrusion die and the input of the pulltrusion die shown in FIG. 16. The material from pump 222 is injected through the entrance areas and discharge areas illustrated in FIGS. 18 and 19. Grippers (not illustrated) are located before the finishing station to pull the woven socks and composite material through the process. A human operator may be involved in the process by attaching the grippers to the layers of woven socks as they are introduced to the conical receiving area. However, the grippers may also be mechanically implemented as part of a continuous manufacturing system (e.g. mechanically dropping to attach themselves to the flanking material).

As the core material is inserted between the woven socks, it is pulled via pulltrusion die 228 through an operating chamber 229. Mandrel 250 (in the illustrated embodiment) runs through the operating chamber to so that the woven socks do not collapse upon themselves and the hole in the center of the product is maintained. Pulltrusion die 228 also includes a plurality of heaters 234 that are schematically shown in FIG. 19. Heaters 234 are used to apply an appropriate amount of heat into the operating chamber 229 to cure the composite material and, therefore, bond it to the flanking material layers 212 as they pass through pulltrusion die 228. The cured article is passed to the finishing station 236 (FIG. 16) for further processing, if desired.

One advantage to the process described in FIG. 16 is that it is a means for efficiently producing tubular shaped objects with commercial speed and accuracy. The hollow tubes (just one of the resulting products from this process) are strong, durable, usable for their strength, yet lighter and easier to manipulate than their metal counterparts. A simple variation to the mandrel shape and diameter (or a substitution of method of creating the center hole) can lead to the production of numerous non-solid (e.g. with a center hole) annular shaped tubes using this manufacturing process.

Figure 21:
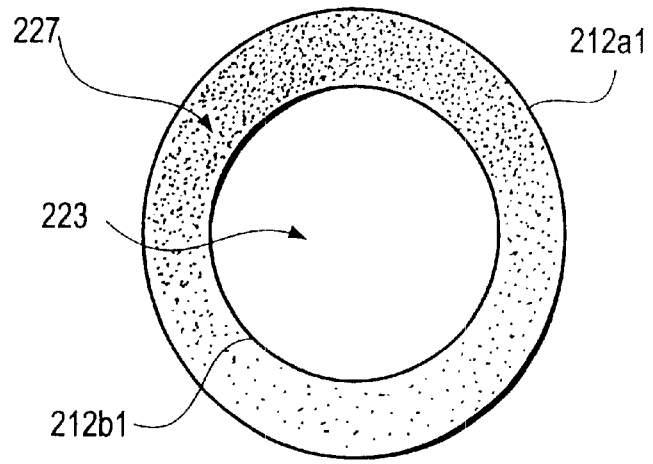
FIG. 21 is a cross-section of an exemplary product that can be made using the manufacturing processes described in FIGS. 16 and 23.
Figure 22:
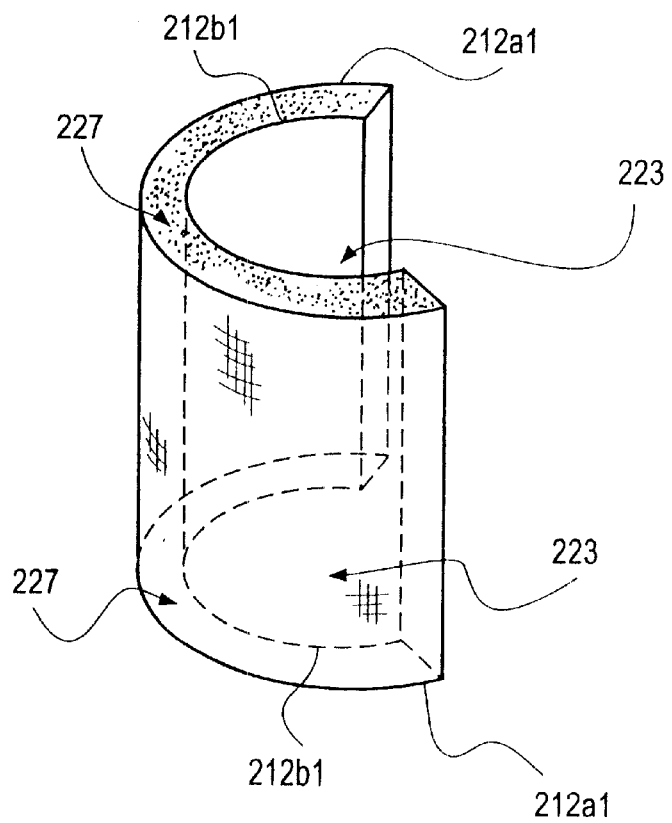
FIG. 22 is a perspective of a sectional view of an exemplary product that can be made using the manufacturing processes described in FIGS. 16 and 23.
Figure 23:
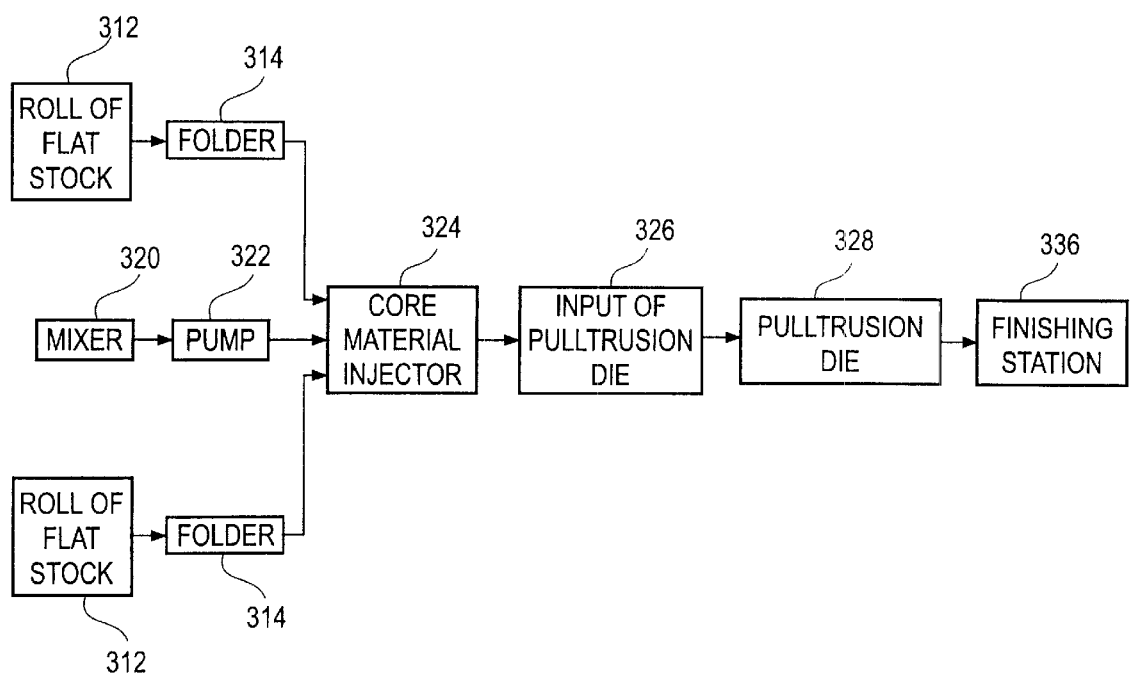
FIG. 23 is a general, schematic diagram of a fourth embodiment of an apparatus for manufacturing articles using a composite material having a high density of small particles such as microspheres in a matrix material, wherein layers of flanking material are folded into an apparatus to create a generally annular shaped final product.

FIGS. 21 and 22 a top and side view respectively of an example of a product that can be made using the manufacturing processes described in FIGS. 16 and 23. FIGS. 21 and 22 show a product made up of an inner layer of hardened, smoothed woven sock 212b1, an outer layer of hardened, smoothed woven sock 212a1, a core material 227, and a center hole 223. Thus, the illustrated product is a tube that used woven socks as its skin material. This is only one example of the numerous non-solid (with a center hole), generally annular shapes that can be created using this process.

Referring to FIG. 23, a general, schematic diagram of yet another alternate embodiment of an apparatus 310 for manufacturing articles utilizing a composite material having a high density of small particles, such as microspheres, in a matrix material is shown. In the illustrated embodiment, apparatus 310 is a modification of apparatus 210 (FIG. 16) in which the weaver boxes 212 are replaced with commercially purchased rolls of flat socks 312 and are folded by folders 314 into the core injector material segment of the process. Afterwards, process 310 is substantially similar to process 210 (FIG. 16).

A mixer 320 and a pump 322 form a portion of apparatus 310. Mixer 320 contains a supply of composite materials, such as, for example, the various composite materials disclosed in the CM application. The particular composite material that is used depends upon the type of article that is to be manufactured as, for example, discussed in the CM application.

Pump 322 provides the particular composite material that is used to a core material injector 324 that is utilized to introduce the composite material between the product 314 of the first folder and the product 314 of the second folder at the receiving area 325 (shown in FIG. 24) around mandrel 350 (shown in FIG. 24) at the core material injector 324. Although not illustrated in detailed view, core material injector 324 is substantially similar to core material injector 224 (FIG. 17). Although the FIG. 17 shows a conical shaped receiving area, it should be understood that any divider may be substituted. This is representative of a divider which creates a separation between the two weaver socks being introduced into the process. A separation between the socks is used to permit the injection of the core material between the two layers of expandable socks. Pump 322 introduces the mixture between the two layers of woven sock as they are pulled through the core injector 224 and through the input of pulltrusion die 326 by pulltrusion die 328.

Figure 24:
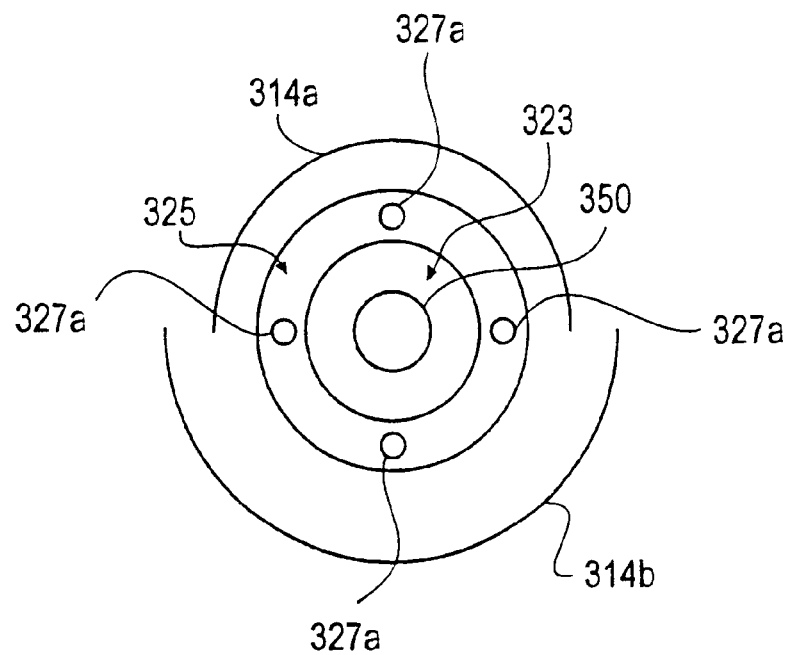
FIG. 24 is a cross-sectional end view of the core material injector as represented in FIG. 23, wherein at least two folders are used to create the outer layer of woven sock material.
Figure 25:
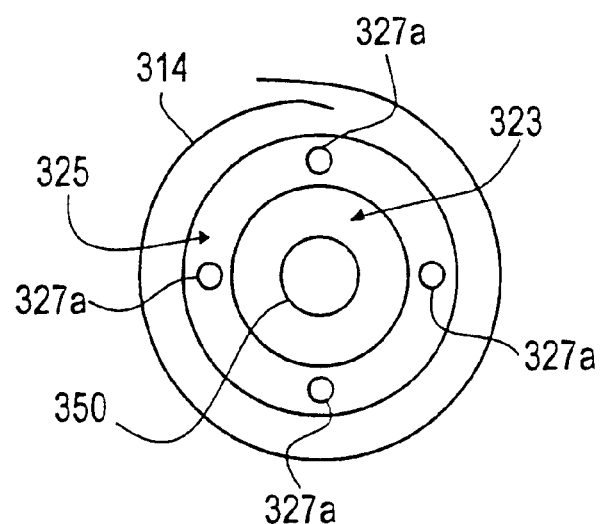
FIG. 25 is a cross-sectional end view of the core material injector as represented in FIG. 23 wherein a single folder is used to create the outer layer of woven sock material.

As illustrated in FIGS. 24 and 25 (and discussed below in greater detail), one layer of flat sock is folded around the inner layer of the receiving area around fixed mandrel 350 while the other layer or layers is wrapped around the outer layer of the receiving area 325. While preferentially conical, receiving area 325 need not be in the shape of a cone. It serves as a separator or place-holder between the weaver socks. However, one skilled in the art could use alternative means to separate the weaver socks in order to inject in the composite material between the layers.

FIG. 24 is a cross-sectional view of the core injector material 324, wherein an outer layer of flexible material is formed by means of two folder devices. One folder folds the woven sock 314a over the top of the receiving area 325 while a second folder folds a second woven sock 314b underneath the receiving area. The schematic in FIG. 23 only contemplates a single outside layer folder, but can also be made up of multiple folders. However, it should be understood that any desired number of folders could be used. FIG. 24 illustrates an embodiment with two folders folding the outer layer of woven sock. One skilled in the art will understand that multiple folders may be used. Sufficient tension is required to maintain some form of the folded sock through the process to preserve the generally annular form of the product and to permit the even distribution of the core material between the layers of folded sock.

FIG. 25, showing a cross-sectional view of the core injector material 234 as represented in FIG. 23, shows the outer layer of weaver sock formation using a single folder 314. The sock can be wrapped around the receiving area of the core material injector in order to form a single continuous outer layer. Sufficient tension must be applied to the folded sock and maintained throughout the process to keep the form of the sock to produce a generally annular final product.

Fixed mandrel 350 (see, e.g., FIGS. 24 and 25) is preferentially a steel tube, fixed in place by a stand, which rests on the ground. A weight is attached to one end of mandrel 350 to maintain balance (as a counter balance) as the process is run. (See, e.g., FIG. 17). Fixed mandrel 350 runs through the process from at least the core material injector to at least the finishing station, thus assisting in the creation of a generally annular, non-solid (e.g. with a center hole) product. Although illustrated as having a more circular shape, mandrel 350 can be a tube of any preferred shape or diameter. Mandrel 350 can pivot about an axis that operatively interacts with pulltrusion die 328 and input of pulltrusion die 326 to facilitate the production of the final product.

As would be understood by one skilled in the art, the mandrel 350 assists in the creation of the center hole in the final product. It is generally used in the illustrated embodiment to prevent the weaver socks from collapsing upon each other. However, this process does not necessarily require the use of a mandrel to create the center hole, but rather may use alternative means to maintain the shape of the weaver socks as the core material is injected between the two layers and solidified through the process.

In the conical receiving area 325, four entrance areas 327a are illustrated. Entrance areas 327a are usually threaded, but such threading is not required. Entrance areas 327a work in conjunction with the pump 322, the core material injector 324, and the input of pulltrusion die 326 to receive via hose-like apparatus the core material. Although four holes are illustrated, this is not a requirement. At least one hole is required to supply the core material to the area between the woven socks. Multiple holes facilitate the smooth, even distribution of the material.

There are also four discharge areas (not pictured) that match-up with the four entrance areas 227a. The discharge areas are elongated so as to facilitate the even distribution of the core material. As stated above, at least one discharge area is required to supply the core material to the are between the woven socks. Multiple discharge areas facilitate the smooth, even distribution of the material. There should be an equal number of discharge areas to entrance areas working in conjunction.

The material from pump 322 is injected through the entrance areas and discharge areas. Grippers (not illustrated) are located before the finishing station to pull the woven socks and composite material through the process. A human operator may be involved in the process by attaching the grippers to the layers of woven socks as they are introduced to the conical receiving area. However, the grippers may also be mechanically implemented as part of a continuous manufacturing system (e.g. mechanically dropping to attach themselves to the flanking material).

As the core material is inserted between the woven socks, it is pulled via pulltrusion die 328 through an operating chamber. A mandrel runs through the operating chamber to so that the woven socks do not collapse upon themselves and the hole in the center of the product is maintained. Pulltrusion die 328 also includes a plurality of heaters. Heaters are used to apply an appropriate amount of heat into the operating chamber to cure the composite material and, therefore, bond it to the flanking material layers 314 as they pass through pulltrusion die 328. The cured article is passed to the finishing station 336 (FIG. 23) for further processing, if desired.

FIG. 23 is a schematic illustration of a modification of the manufacturing process schematically described in FIG. 16. The advantage of FIG. 23 is that it does not require the independent manufacture of woven socks. Rather, it provides for the purchase of commercially produced rolls of flat socks that are folded around a receiving area in the core injector material area. A mandrel may be used to prevent the woven socks from collapsing (and thus preserving a hole in the final product). However, a mandrel is not necessarily required. Grippers, however, are an important element to move the woven socks (with the layer of core material) through the process with sufficient tension to maintain the integrity of the shapes created.

The methods illustrated by FIGS. 16 and 23 will both result in the production of non-solid (e.g. with a center hole), generally annular shaped products. These methods can produce a variety of different generally annular shaped, tube-like products with the core material inserted between two layers of material (generally woven socks) and solidified.

Figure 26:
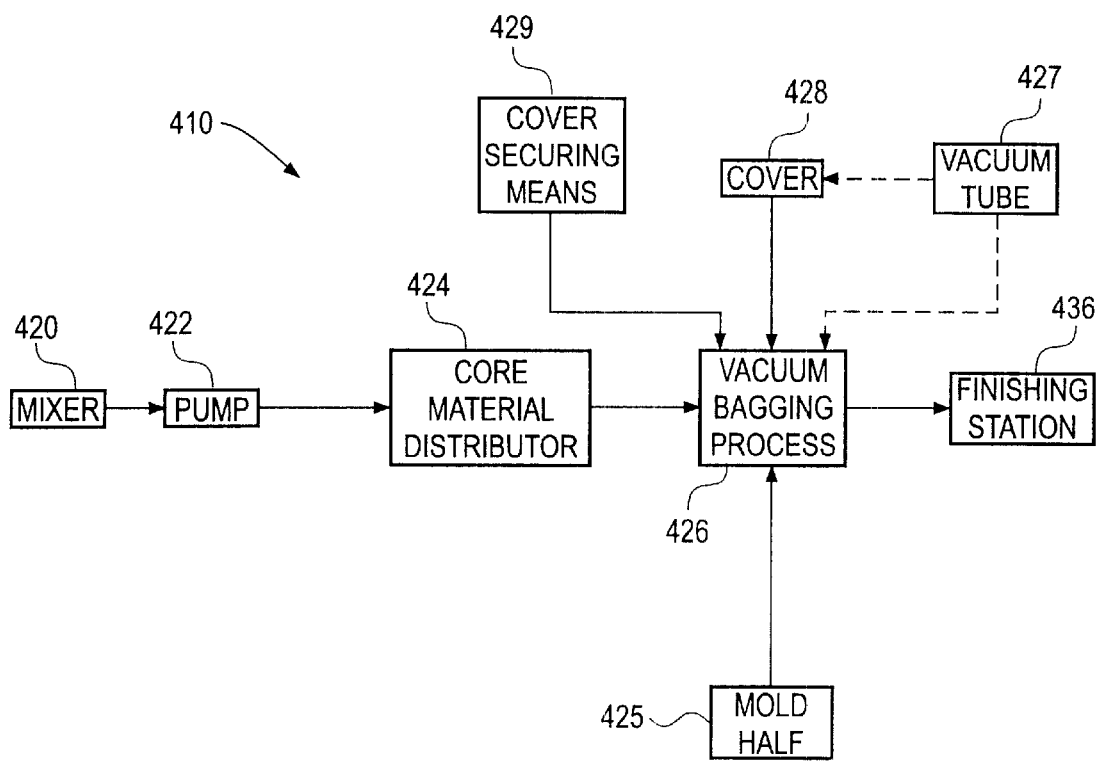
FIG. 26 is a general, schematic diagram of a fifth embodiment of a process for manufacturing articles using a composite material having a high density of small particles such as microspheres in a matrix material, wherein the core material is distributed over a mold half and a vacuum bagging process is used to form the composite material into a desired shape.

Referring to FIG. 26, a general, schematic diagram of apparatus 410 for manufacturing articles using a composite material having a high density of small particles such as microspheres in a matrix material, wherein the core material is distributed over a mold half 425 and a vacuum bagging process 426 is used to form the finished product. The central aspect of apparatus 410 is a vacuum bagging process 426, more details of which will be described below.

A mixer 420 and a pump 422 form a portion of apparatus 410. Mixer 420 contains a supply of composite materials, such as, for example, the various composite materials disclosed in the CM application. In accordance with one aspect of this embodiment of the present invention, an operator applies was to the article defining cavity of the mold half so that any pores in the mold are filled in. Then, a green seal material is applied to the exposed wax surface by, for example, a human operator brushing the green seal material directly on the wax surface. After about 5 to 10 minutes, the green seal material dries. After this, the composite material is spread on the green sealed and waxed mold half to allow the finished product to be formed. After the article if formed, the green seal material is removed from the article by, for example, a human operator spraying the finished article with water, and then drying the finished sprayed article.

Pump 422 provides the particular composite material 432 (FIGS. 27 and 28) that will be distributed by the core material distributor 424 onto mold half 425 in the vacuum bagging process.

Figure 27:
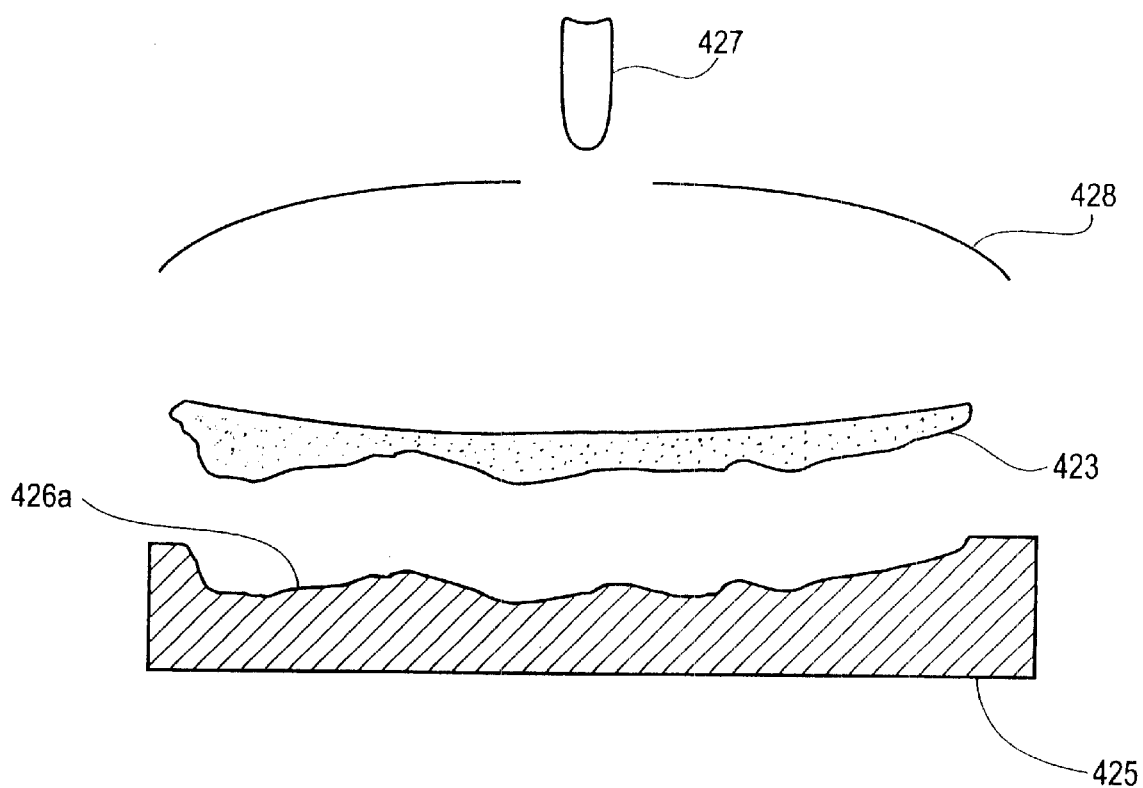
FIG. 27 is an exploded view of some of the components of one example of the vacuum bagging process.
Figure 28:
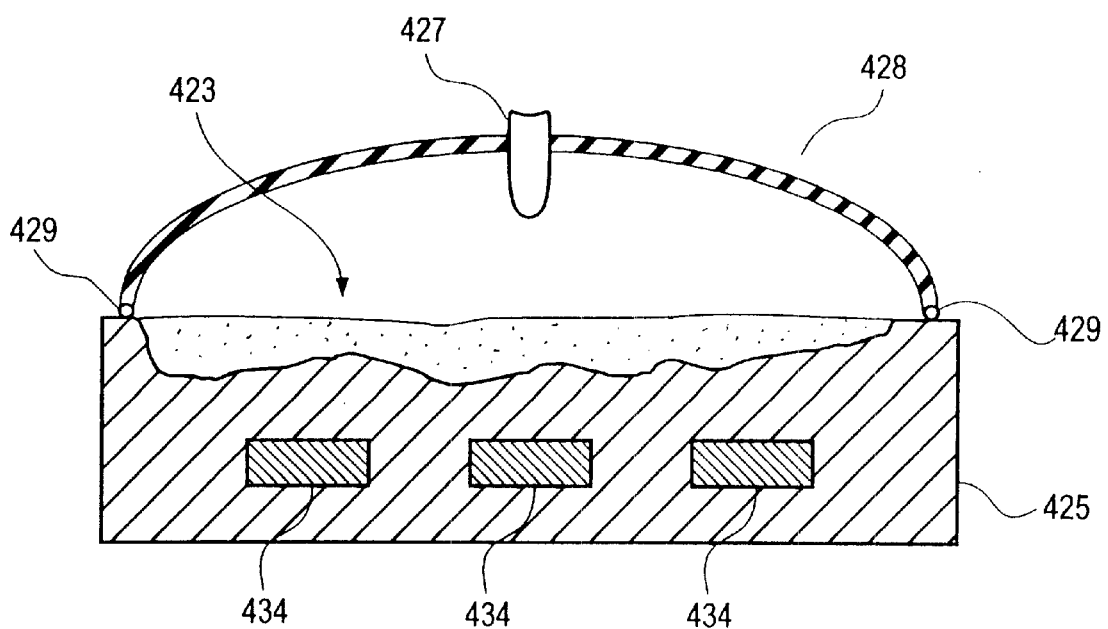
FIG. 28 is a view of an exemplary vacuum bagging process using the composite material.

Referring to FIGS. 27 and 28, sketches of a possible form of a vacuum bagging process 426 are shown. FIG. 27 shows an exploded view while FIG. 28 details how the elements may be put together. Both FIGS. 27 and 28 show a mold half 425 with a cover 428 and a vacuum tube 427 that are operably secured together in accordance with the vacuum bagging process disclosed herein. More details are included in the descriptions below.

Mold half 425 contains an article defining cavity 426A that allows a class A surface to be formed on at least a portion of the exposed surface of an article that is to be formed therein. It should be understood that the article defining cavity 426A may be of any desired shape or depth, depending on the final product that is desired. The mold half may be made of any material that is expedient, available, or otherwise desirable. Examples of materials for a mold half may include epoxy, plastic, or wood. It should be understood, however, that any material that can make a mold half is acceptable.

A human operator uses mechanical means to distribute the core material 423 over a mold half 425. A core material 423 is generally distributed consistently (e.g. evenly) over the surface of a mold half 425. When using a rapid prototype method, as discussed in greater detail hereinafter, the class A wall stock need not be uniformly thick so long as the portions of the article that are to be viewed by a user (such as, for example, the exposed surface of a dashboard cover in connection with a motor vehicle application of this aspect of the present invention).

A cover 428 is placed over a mold half 425 after a composite material 423 has been placed into the mold half 425. It should be understood that the distribution of the core material 423 is generally even, but amount, thickness, density, and general placement may vary according to the preferences for the final design. Core material 423 may be B stage material. The cover 428 is preferentially made of a durable plastic and secured to make an airtight environment. Although the cover 428 is generally a plastic cover, it should be understood that it could be made up of a variety of plastic strengths and flexibility. One example of such cover is a plastic bag. The plastic (e.g. plastic bag) or other cover need not be uniformly thick. Additionally, it should be understood by one skilled in the art that the cover can be of any material that would create an airtight seal and provide the proper environment for the vacuum bagging process.

Alternatively, the core material may be injected (or infused in a generally even pattern) into a mold half 425 after the mold half has a cover 428 placed over it either before or after the cover securing means 429 secure the cover to the mold half (this example is not shown). If using this method, any injector of the core material would have to be accounted for in the vacuum bagging process and could not compromise the secure air vacuum created.

A vacuum tube 427 is inserted into a cover 428 (See FIGS. 26–28). A cover 428 may have a pre-cut hole of the appropriate size to accommodate the proper fitting of a vacuum tube 427 while preserving the airtight environment provided in connection with the vacuum bagging process 426. A vacuum tube 427 may be inserted into a cover 428 prior to the cover 428 being placed over a mold half 425. Alternatively, vacuum tube 427 may be inserted into the predetermined location in cover 428 after cover 428 was placed over a mold half 425. (The broken lines in FIG. 26 indicate these alternatives). Once a cover 428 is placed over a mold half 425 that has been filled with core material 423 (FIGS. 27 and 28), it may be secured by cover securing means 429 (FIG. 28). Cover securing means 429 may be any means of attaching a cover 428 to a mold half 425 for a secure air vacuum for vacuum bagging process 426. Cover securing means 429 generally is an adhesive (e.g. tape, duct tape, glue or other securing system). However, it should be understood that any means that secure a cover 428 to a mold half 425 in a secure air vacuum is acceptable.

After the secure air vacuum is created, a light pressure is applied. A vacuum tube 427 pulls air down, preferentially at about 14-lbs./sq. inch. Mold half 425 or other base of vacuum bagging process 426 includes a plurality of heaters 434 that are schematically shown in FIG. 28. Heaters 434 are used to apply an appropriate amount of heat into the vacuum bagging process 426 to cure the composite material to create a product that conforms with the shape, depth and definition of a mold half 425. Alternatively, heaters 434 may be placed in a mold half 425 to apply an appropriate amount of heat to cure the composite material to create a product that conforms with the shape, depth and definition of mold half 425. The cured product is passed to a finishing station 436 (FIG. 26) for further processing, if desired.

One major advantage of the present invention is that it provides a fast and inexpensive method of producing products out of a desired composite material. Steel molds typically take approximately 6–8 weeks to complete before one part can be manufactured. Additionally, tooling costs for such molds can run into the several hundred thousand dollars range. In accordance with this aspect of the present invention, however, manufacturing an article from a composite material only will take approximately one week, and the associated tooling costs are substantially less on the order of a few thousand dollars. This method provides, for example, a rapid prototype system that gives very quick feedback to product designers regarding the part that they are trying to create. Additionally, this aspect of the present invention allows low volume product runs to be made in an economically feasible and profitable manner.

Figure 29:
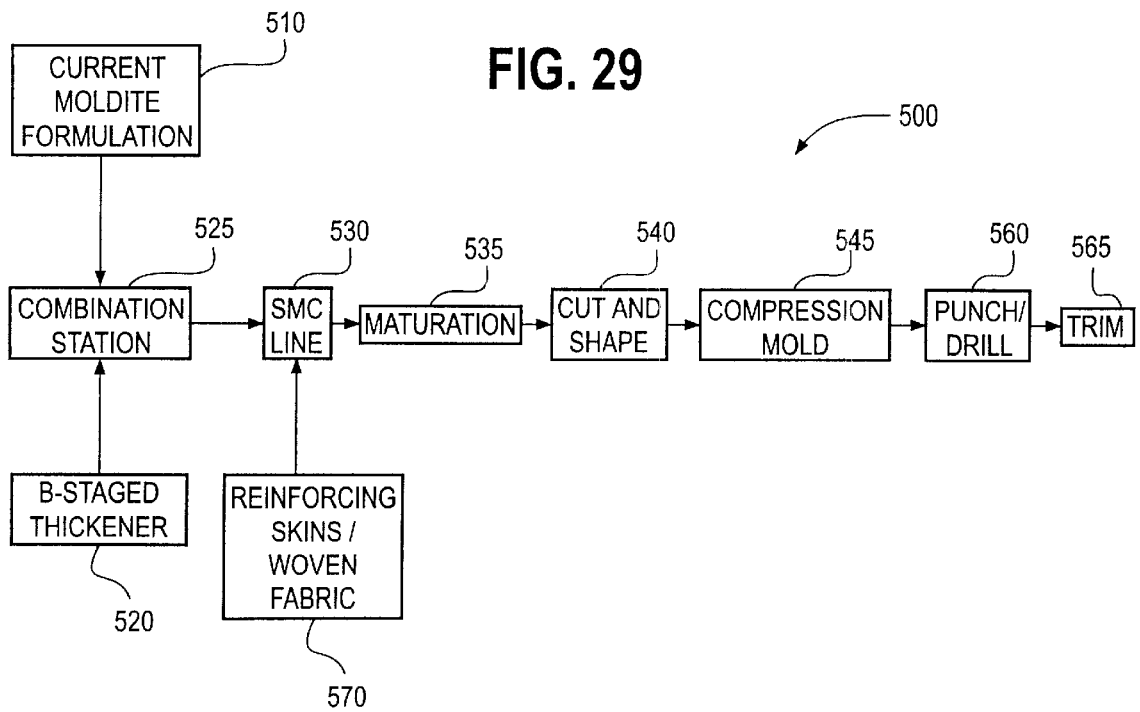
FIG. 29 is a general, schematic diagram of a sixth embodiment of an apparatus for manufacturing articles using a composite material having a high density of small particles such as microspheres in a matrix material, wherein a single stage compression molding technique is used to form a final product using B staging chemistry.

Referring to FIG. 29, a general, schematic diagram of a sixth embodiment of a process 500 for manufacturing articles using a composite material having a high density of small particles such as microspheres in a matrix material is shown. In accordance with this aspect of the present invention, a single stage compression molding technique is used to form a final product in connection with B staging chemistry. A B-staged thickener 520 is added to a current composite material formulation 510 at a combination station 525. The thickened composite material is preconsolidated with reinforcing skins (e.g. woven fabrics) 570 at a sheet molding compound ("SMC") line 530. After a period of maturation 535, the product is cut and shaped at station 540 into charges that are then placed into a three-dimensional compression mold 545. Compression mold 545 is utilized to form the final products. Further details concerning this aspect of the present invention will become apparent through the discussion presented hereinafter.

Figure 30:
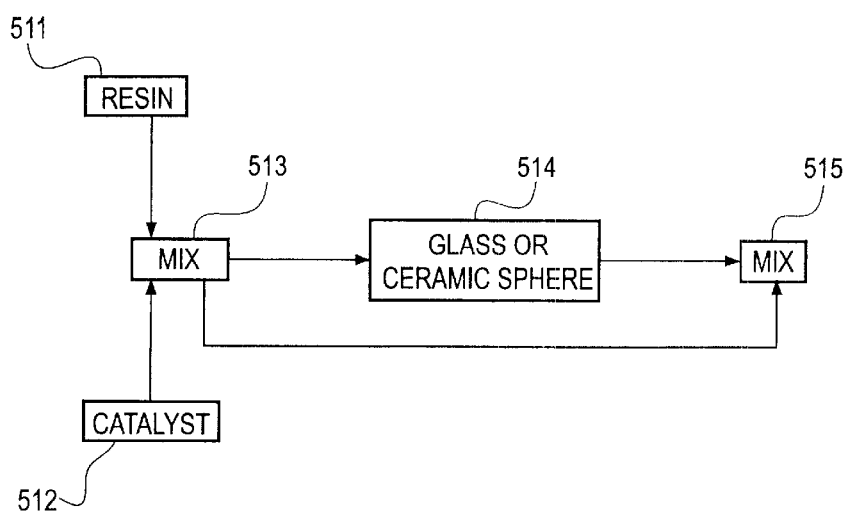
FIG. 30 is a general, schematic diagram describing a system for forming a composite material as disclosed in the CM application.

Referring to FIG. 30, a schematic representation of the process for creating a current composite material formulation 510 is shown. A resin 511 and a catalyst 512 is mixed (513 and 515) to form the current composite material. A resin 511 may be, for example, polyurethane, polyester, vinyl ester or epoxy as disclosed in the CM application. A glass or ceramic sphere 514 may be added to the resin and catalyst mixture to thicken the product and assist in the forming of some composite materials. The products are all mixed together for an additional time at station 515. It should be understood that the glass or ceramic sphere, although preferred, is not a requirement to make the resin and catalyst mixture. The materials are, however, mixed twice to produce the current composite material formulation 510.

Referring back to FIG. 29, a B-staged thickener 520 is added to the current moldite formulation 525 to make the B-staged moldite. The thickening agent used will depend on the resin 511 used. For example, if a polyurethane resin is used, then a blocked Diisocyante prepolymer hardener will be used as the B-staged thickener. Alternatively, if the resin is a polyester or vinyl ester, then a magnesium oxide dispersion system should be used as the B-staged thickener. When the current moldite formulation and the thickener are combined, there should be a rapid raise in viscosity in the newly formed B-staged composite material.

The newly formed B-staged composite material is pre-consolidated with the reinforcing skins (woven fabric) 570 at the SMC line 530. A filler and mold release should be added to the mixture. It should be understood that the reinforcing skins 570 may be stitched, woven, mat, or continuous rows as discussed above.

Figure 31:
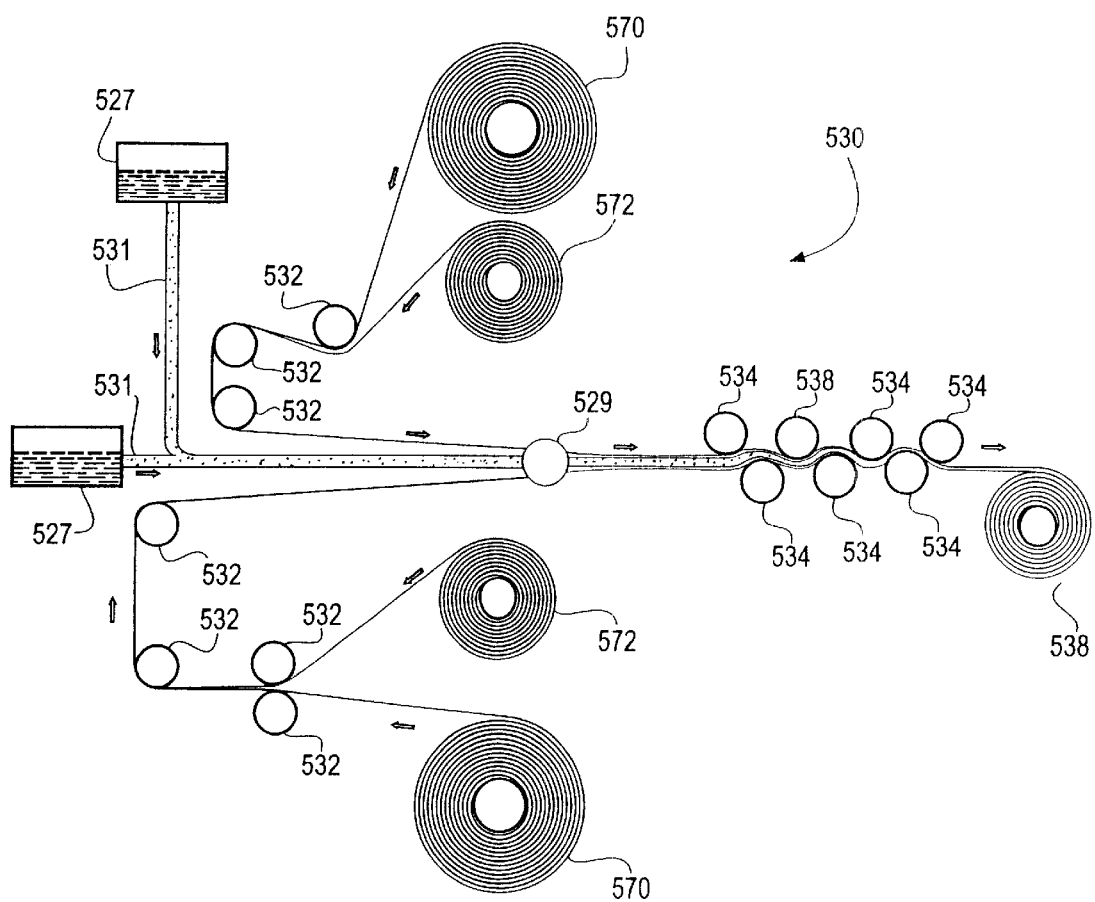
FIG. 31 is a diagram an apparatus for forming shaped charges of a composite material that may be molded into a finished article by a compression molding technique.

Referring to FIG. 31, a sketch of one example of an SMC line, the thickened composite material (B-staged composite material) 527 is placed in a doctor box 531. It should be understood that although the diagram shows a system with two doctor boxes, a system with one or more doctor boxes may be used. The doctor box (or boxes) feed the thickened composite material into the SMC line. In the diagram shown, the doctor boxes feed the material into a single point 529. Although the diagram shows that the thickened moldite is fed into the system by a single line, it should be understood that there may be several lines feeding B-staged moldite to a point 529.

Reinforced fabric 570 is fed into the system from a roll. Although the drawing shows two points of reinforced fabric feed into a point 529, it should be understood that it is not a requirement that the fabric be on a roll nor that there be two. The invention also contemplates one or more feeds of reinforced fabric, which may include weaver boxes, folders, or other manual or mechanical feeder systems. One criteria of this aspect of the present invention is that the reinforced fabric is introduced into the system at a point 529 so it may be pre-consolidated with the thickened composite material.

Poly film 572 is introduced into the system with the reinforced fabric. It should be understood that Poly film is not a necessary part of the invention, but if it is included, it should be added in conjunction with the reinforced fabric, in the same amount and fed into the system the same way that the reinforced fabric is added. The Poly film, if used, merges with the reinforced fabric to create an additional protective coating or skin.

Rollers 532 are shown to exist at various points in the feeder system to flatten and move the reinforced fabric and poly film through the system until it merges with the thickened core material 527 in pre-consolidation. Additionally, a plurality of rollers 534 may exist along the SMC line. It should be understood that while it is preferred to have a pre-compaction roller option installed along the SMC line, it is not mandatory to successfully produce the material.

Although a flexible precored material was completely consolidated with reinforcing skins on a 24 inch SMC line, it should be understood that the compounding of the compression moldite may be produced on any width SMC line. FIG. 31 shows a moldite roll 538 after preconsolidation. It should be understood that the preconsolidation of the reinforced product need not form a roll, but rather will form a material with a handling consistency of leather. This product may be placed into a roll (as shown), or may be flattened, or otherwise handled as necessary to facilitate the compression molding steps. The B-staged moldite has been formed when the resin system (with the thickened current moldite formulation) completely wet out the skins, demonstrating that the core and flanking skins are completely consolidated.

After being pre-consolidated on the SMC line, the thickened composite material and flanking reinforcing skins go through a period of maturation 535 (FIG. 29). At this time, the fibers of the reinforcing skins become completely wet out to form the consolidated product. The fiber wetout maturation can take between 12 and 72 hours, depending on the chemistry and resin used. The moldite, once completely consolidated, can be cut and shaped 540 to the size and shape of the mold. The pre-consolidated charges are pretensioned to control fiber orientation (not shown). This pretensioning works in conjunction with a compression mold 545. Pretensioning grippers or clips in a spring-loaded frame encompassing the entire mold (not shown) hold the compression moldite in place to orient the fibers during the compression mold process. The orientation of the fiber is considered a critical aspect for the system's physical performance.

After the composite material has been formed in the compression mold, it is trimmed 560 and punched or drilled 565 into the final desired form. Since the thickened composite material was pre-consolidated with the reinforcing skins, it is still pliable after being formed and can readily be adjusted in the final stages of production.

The above-described process produces the same core materials consisting of the high sphere to resin ratio to achieve the lightweight rigid core properties achieved. One advantage of the aspect of the present invention that is described in FIG. 29 is that is includes relatively few manufacturing steps. In accordance with certain aspects of the present invention, a B-staged composite material is formed, such material is cut into discrete charges, and each discrete charge is placed into a compression mold to allow a finished article to be manufactured. The B staging chemistry allows the pre-consolidation of the reinforcing material and the composite material, and allows a product to be formed by simultaneously adding thickened composite material and reinforcing skins on an SMC line.

Another advantage of this particular technique is that the materials can be handled manually. The thickened preconsolidated materials can be cut into charges and placed into a three-dimensional compression mold. The material, since still pliable, can be modified after forming. Additionally, this method requires less time and labor, so is both an efficacious and cost-effective means for producing three dimensional shapes of desired shapes, lengths, and forms.

Regarding the embodiments of the invention disclosed in connection with FIGS. 1–25 and 29–31, examples of composite materials that can be formed into finished articles by such embodiments are disclosed in the CM application. However, in accordance with a preferred embodiment of each embodiment, a predetermined amount of mold release and filler are utilized. Generally, 2% mold release by weight of composite material should be used. The amount of filler (which is can be calcium carbonate (limestone) or clay) varies, depending on the physical characteristics of the part formed and the type of skin used. As one example, when using woven socks to create a pipe shaped article, approximately 5% filler by weight should be used. The mold release and filler are used to fill in the gaps in the fibers to create a smooth finished product.

Regarding the embodiment of the invention illustrated in connection with FIGS. 26–28, it should be appreciated that, in stead of utilizing the waxing and green sealing steps described above, that it also is possible to utilize a predetermined amount of mold release and filler material.

It should be observed that the scope of the novel concepts of the present invention allows for an unlimited number of different items and parts to be made using the described invention. For example, the present invention lends itself to making many different automobile parts, comprising, inter alia, quarter panels, hoods, trunk lids, and the like. It also should be understood that the present invention is suitable for manufacturing articles that are used in numerous non-automotive applications such as, for example, forming any number of standard preformed materials that are utilized in the construction industry to build homes, buildings, and the like.

From the foregoing, it will also be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims when the claims are properly interpreted.

What is claimed is:

1. A method of manufacturing an article comprising the steps of:

providing a predetermined amount of a composite material that has a high density of small particles disposed in a matrix material;

mixing said composite material with a thickening agent;

feeding first and second skins through a sheet molding compound line while injecting said thickened composite material into a space that is defined between said first and second skins as they are fed into said sheet molding compound line to form a thickened composite material sandwich;

cutting said thickened composite material sandwich into a charge; and compression molding said charge into a desired shape to form a cured article.

2. The method of claim 1 wherein said first and second reinforcing skins are selected from the group consisting of carbon fibers, glass fibers, uni-directional fibers, cross-woven fibers, matte fibers, fiber braid, uni-directional stitch woven carbon fiber braid, carbon felt, felt, plastic, leather, foil, metal, composite, thermoplastic, thermoset, resin, fiberglass, and ceramic.

3. The method of claim 1 further comprising the step of allowing said thickened composite material to wetout said first and second skins before cutting said thickened composite material sandwich.

4. The method of claim 1 further comprising the step of performing a finishing operation on said compression molded charge.

5. The method of claim 4 wherein said compression molded charge is trimmed.

6. The method of claim 4 wherein said compression molded charge is punched.

7. The method of claim 4 wherein said compression molded charge is drilled.

8. The method of claim 1 wherein said composite material is formed from predetermined portions of a resin, catalyst and microspheres.

9. The method of claim 8 wherein said resin is selected from a group consisting of polyurethane, polyester, vinyl ester and epoxy.

10. The method of claim 1 wherein said thickening agent comprises diisoycynate prepolymer.

11. The method of claim 1 wherein said thickening agent comprises a magnesium oxide dispersion.

12. The method of claim 1 further comprising the step of feeding one or more poly films through said sheet molding compound line when said first and second skins are fed through said sheet molding compound line.

* * * * *